United States Patent
Schwantes

(10) Patent No.: US 8,071,214 B2
(45) Date of Patent: Dec. 6, 2011

(54) PARTICLE WITH SELECTED PERMEANCE WALL

(75) Inventor: Todd Arlin Schwantes, Lena, WI (US)

(73) Assignee: Appleton Papers Inc., Appleton, WI (US)

(*) Notice: Subject to any disclaimer, the term of this patent is extended or adjusted under 35 U.S.C. 154(b) by 38 days.

(21) Appl. No.: 12/221,781

(22) Filed: Aug. 6, 2008

(65) Prior Publication Data

US 2009/0274907 A1    Nov. 5, 2009

Related U.S. Application Data

(63) Continuation-in-part of application No. 12/149,424, filed on May 1, 2008.

(51) Int. Cl.
*B32B 5/16* (2006.01)
(52) U.S. Cl. .......... 428/402.22; 428/402.21; 264/4.7
(58) Field of Classification Search .......... 526/73, 526/319; 428/402.2, 402.21
See application file for complete search history.

(56) References Cited

U.S. PATENT DOCUMENTS

| | | | |
|---|---|---|---|
| 2,730,456 A | 1/1956 | Greene et. al. | 503/214 |
| 2,800,457 A | 7/1957 | Greene et. al. | 428/402.2 |
| 2,800,458 A | 7/1957 | Greene et. al. | 428/402.2 |
| 3,516,941 A | 6/1970 | Matson | 264/4.33 |
| 3,660,304 A | 5/1972 | Matsukawa | 264/4.3 |
| 3,886,085 A | 5/1975 | Kiritani et al. | 428/402.21 |
| 3,965,033 A | 6/1976 | Matsukawa et al. | 264/4.3 |
| 4,001,140 A | 1/1977 | Foris et al. | 252/316 |
| 4,087,376 A | 5/1978 | Foris et al. | 252/316 |
| 4,089,802 A | 5/1978 | Foris et al. | 252/316 |
| 4,093,556 A | 6/1978 | Wojciak | 252/316 |
| 4,100,103 A | 7/1978 | Foris et al. | 252/316 |
| 4,166,152 A | 8/1979 | Baker et al. | 428/522 |

(Continued)

FOREIGN PATENT DOCUMENTS

JP    10-294293    10/1998

(Continued)

OTHER PUBLICATIONS

"Encapsulation" in Kirk-Othmer Encyclopedia of Chemical Technology, Fifth Edition, pp. 438-463.

(Continued)

*Primary Examiner* — James J Seidleck
*Assistant Examiner* — S. Camilla Pourbohloul
(74) *Attorney, Agent, or Firm* — Benjamin Mieliulis

(57) ABSTRACT

The invention discloses a population of selected permeability microcapsule particles comprising an oil soluble or dispersible core material and a wall material at least partially surrounding the core material. The microcapsule wall material comprises the reaction product of a first composition in the presence of a second composition comprising an anionic emulsifier. The first composition comprises a reaction product of i) an oil soluble or dispersible amine with ii) a multifunctional acrylate or methacrylate monomer or oligomer, an oil soluble acid and an initiator. The anionic emulsifier comprises a water soluble or water dispersible acrylic acid alkyl acid copolymer, an optional initiator and an alkali or alkali salt. The reaction product of the first composition and second composition can result in the formation of a low permeability microcapsule wall. Optionally, one or both of the first composition initiator or water phase initiator is an energy-activated initiator, such as a UV initiator. The reaction can proceed by exposing the respective compositions to actinic radiation. Microcapsules of selected permeability can be produced by the process of the invention.

23 Claims, 5 Drawing Sheets

U.S. PATENT DOCUMENTS

| | | | |
|---|---|---|---|
| 4,197,346 A | 4/1980 | Stevens | 428/307 |
| 4,221,710 A | 9/1980 | Hoshi et al. | 260/17.3 |
| 4,251,386 A | 2/1981 | Saeki et al. | 252/316 |
| 4,285,720 A | 8/1981 | Scher | 71/88 |
| 4,356,109 A | 10/1982 | Saeki et al. | 252/316 |
| 4,444,699 A | 4/1984 | Hayford | 264/4.7 |
| 4,547,429 A | 10/1985 | Greiner et al. | 428/402.24 |
| 4,552,811 A | 11/1985 | Brown et al. | 428/402.21 |
| 4,588,639 A | 5/1986 | Ozono | 428/402.22 |
| 4,601,863 A | 7/1986 | Shioi et al. | 264/4.3 |
| 4,610,927 A | 9/1986 | Igarashi et al. | 428/402.21 |
| 4,622,267 A | 11/1986 | Riecke | 428/402.21 |
| 4,654,256 A * | 3/1987 | Doree et al. | 428/304.4 |
| 4,708,924 A | 11/1987 | Nagai et al. | 430/138 |
| 5,071,706 A * | 12/1991 | Soper | 428/402.2 |
| 5,105,823 A | 4/1992 | Hasler et al. | 128/754 |
| 5,126,061 A | 6/1992 | Michael | 510/106 |
| 5,229,243 A * | 7/1993 | Sasaki et al. | 430/110.2 |
| 5,292,835 A * | 3/1994 | Jahns et al. | 526/73 |
| 5,407,609 A | 4/1995 | Tice et al. | 264/46 |
| 5,596,051 A | 1/1997 | Jahns et al. | 526/73 |
| 6,375,872 B1 | 4/2002 | Chao | 264/4.33 |
| 6,531,156 B1 | 3/2003 | Clark | 424/489 |
| 6,592,990 B2 | 7/2003 | Schwantes | 428/402.21 |
| 6,849,591 B1 * | 2/2005 | Boeckh et al. | 510/475 |
| 2006/0263518 A1 * | 11/2006 | Schwantes et al. | 427/213.3 |

FOREIGN PATENT DOCUMENTS

JP    2002-235483    8/2002

OTHER PUBLICATIONS

Huber et. al. in "Capsular Adhesives", TAPPI, vol. 49, No. 5, pp. 41A-44A, May 1966.

* cited by examiner

US 8,071,214 B2

PARTICLE WITH SELECTED PERMEANCE WALL

This application is a continuation-in-part of Schwantes U.S. Ser. No. 12/149,424 filed May 1, 2008.

BACKGROUND OF THE INVENTION

1. Field of the Invention

This invention relates to capsule manufacturing processes and microcapsules produced by such processes.

2. Description of the Related Art

Various processes for microencapsulation, and exemplary methods and materials are set forth in Schwantes (U.S. Pat. No. 6,592,990), Nagai et. al. (U.S. Pat. No. 4,708,924), Baker et. al. (U.S. Pat. No. 4,166,152), Wojciak (U.S. Pat. No. 4,093,556), Matsukawa et. al. (U.S. Pat. No. 3,965,033), Matsukawa (U.S. Pat. No. 3,660,304), Ozono (U.S. Pat. No. 4,588,639), Irgarashi et. al. (U.S. Pat. No. 4,610,927), Brown et. al. (U.S. Pat. No. 4,552,811), Scher (U.S. Pat. No. 4,285,720), Shioi et. al. (U.S. Pat. No. 4,601,863), Kiritani et. al. (U.S. Pat. No. 3,886,085), Jahns et. al. (U.S. Pat. Nos. 5,596,051 and 5,292,835), Matson (U.S. Pat. No. 3,516,941), Chao (U.S. Pat. No. 6,375,872), Foris et. al. (U.S. Pat. Nos. 4,001,140; 4,087,376; 4,089,802 and 4,100,103), Greene et. al. (U.S. Pat. Nos. 2,800,458; 2,800,457 and 2,730,456), Clark (U.S. Pat. No. 6,531,156), Saeki et. al. (U.S. Pat. Nos. 4,251,386 and 4,356,109), Hoshi et. al. (U.S. Pat. No. 4,221,710), Hayford (U.S. Pat. No. 4,444,699), Hasler et. al. (U.S. Pat. No. 5,105,823), Stevens (U.S. Pat. No. 4,197,346), Riecke (U.S. Pat. No. 4,622,267), Greiner et. al. (U.S. Pat. No. 4,547,429), and Tice et. al. (U.S. Pat. No. 5,407,609), among others and as taught by Herbig in the chapter entitled "Encapsulation" in Kirk Othmer, Encyclopedia of Chemical Technology, V.13, Second Edition, pages 436-456 and by Huber et. al. in "Capsular Adhesives", TAPPI, Vol. 49, No. 5, pages 41A-44A, May 1966, all of which are incorporated herein by reference.

More particularly, U.S. Pat. Nos. 2,730,456, 2,800,457; and 2,800,458 describe methods for capsule formation. Other useful methods for microcapsule manufacture are: U.S. Pat. Nos. 4,001,140; 4,081,376 and 4,089,802 describing a reaction between urea and formaldehyde; U.S. Pat. No. 4,100,103 describing reaction between melamine and formaldehyde; British Pat. No. 2,062,570 describing a process for producing microcapsules having walls produced by polymerization of melamine and formaldehyde in the presence of a styrene-sulfonic acid. Forming microcapsules from urea-formaldehyde resin and/or melamine formaldehyde resin is disclosed in U.S. Pat. Nos. 4,001,140; 4,081,376, 4,089,802; 4,100,103; 4,105,823; and 4,444,699. Alkyl acrylate-acrylic acid copolymer capsules are taught in U.S. Pat. No. 4,552,811. Each patent described throughout this application is incorporated herein by reference to the extent each provides guidance regarding microencapsulation processes and materials.

Interfacial polymerization is a process wherein a microcapsule wall of a polyamide, an epoxy resin, a polyurethane, a polyurea or the like is formed at an interface between two phases. U.S. Pat. No. 4,622,267 discloses an interfacial polymerization technique for preparation of microcapsules. The core material is initially dissolved in a solvent and an aliphatic diisocyanate soluble in the solvent mixture is added. Subsequently, a nonsolvent for the aliphatic diisocyanate is added until the turbidity point is just barely reached. This organic phase is then emulsified in an aqueous solution, and a reactive amine is added to the aqueous phase. The amine diffuses to the interface, where it reacts with the diisocyanate to form polymeric polyurethane shells. A similar technique, used to encapsulate salts which are sparingly soluble in water in polyurethane shells, is disclosed in U.S. Pat. No. 4,547,429. U.S. Pat. No. 3,516,941 teaches polymerization reactions in which the material to be encapsulated, or core material, is dissolved in an organic, hydrophobic oil phase which is dispersed in an aqueous phase. The aqueous phase has dissolved materials forming aminoplast resin which upon polymerization form the wall of the microcapsule. A dispersion of fine oil droplets is prepared using high shear agitation. Addition of an acid catalyst initiates the polycondensation forming the aminoplast resin within the aqueous phase, resulting in the formation of an aminoplast polymer which is insoluble in both phases. As the polymerization advances, the aminoplast polymer separates from the aqueous phase and deposits on the surface of the dispersed droplets of the oil phase to form a capsule wall at the interface of the two phases, thus encapsulating the core material. This process produces the microcapsules. Polymerizations that involve amines and aldehydes are known as aminoplast encapsulations. Urea-formaldehyde (UF), urea-resorcinol-formaldehyde (URF), urea-melamine-formaldehyde (UMF), and melamine-formaldehyde (MF), capsule formations proceed in a like manner. In interfacial polymerization, the materials to form the capsule wall are in separate phases, one in an aqueous phase and the other in a fill phase. Polymerization occurs at the phase boundary. Thus, a polymeric capsule shell wall forms at the interface of the two phases thereby encapsulating the core material. Wall formation of polyester, polyamide, and polyurea capsules typically proceeds via interfacial polymerization.

U.S. Pat. No. 5,292,835 teaches polymerizing esters of acrylic acid or methacrylic acid with polyfunctional monomers. Specifically illustrated are reactions of polyvinylpyrrolidone with acrylates such as butanediol diacrylate or methylmethacrylate together with a free radical initiator.

Common microencapsulation processes can be viewed as a series of steps. First, the core material which is to be encapsulated is typically emulsified or dispersed in a suitable dispersion medium. This medium is typically aqueous but involves the formation of a polymer rich phase. Most frequently, this medium is a solution of the intended capsule wall material. The solvent characteristics of the medium are changed such as to cause phase separation of the wall material. The wall material is thereby contained in a liquid phase which is also dispersed in the same medium as the intended capsule core material. The liquid wall material phase deposits itself as a continuous coating about the dispersed droplets of the internal phase or capsule core material. The wall material is then solidified. This process is commonly known as coacervation.

Capsules made according to the invention can be made to better control permeability characteristics. Capsules made according to the invention are surprisingly better able to contain liquid contents without leakage over time. The capsules can be made less leaky than those made by comparable prior art processes.

The capsules according to the invention are useful with a wide variety of capsule contents ("core materials") including, by way of illustration and without limitation, internal phase oils, solvent oils, dyes, perfumes, fragrances, cleaning oils, polishing oils, flavorants, sweeteners, chromogens, pharmaceuticals, fertilizers, herbicides, scents, and the like. The microcapsule core materials can include materials which alter rheology or flow characteristics, or extend shelf life or product stability. Essential oils as core materials can include, for example, by way of illustration wintergreen oil, cinnamon oil, clove oil, lemon oil, lime oil, orange oil, peppermint oil and the like. Dyes can include fluorans, lactones, indolyl red, I6B, leuco dyes, all by way of illustration and not limitation. The core material should be dispersible or sufficiently soluble in the capsule internal phase material namely in the internal phase oil or soluble or dispersible in the monomers or oligomers solubilized or dispersed in the internal phase oil. The core materials are preferably liquid but can be solid depending on the materials selected, and with temperatures appropriately adjusted to effect dispersion.

Low capsule permeability is a sought after characteristic of microcapsules for many applications. Although various microencapsulation processes are known, a need has existed in particular for lower permeability and more durable capsules.

Conventional techniques for capsule rupture include pressure, scraping, friction, shearing, impact, or other energy input such as rapid temperature gradient such as provided by laser impingement.

The low permeability characteristics of the capsules disclosed herein have usefulness for a variety of applications. The internal phase can be held securely over time but available to be exuded or released upon fracture or breakage of the capsules such as with application of pressure, ultrasonics, tearing forces, scraping, or friction. Heat rupture, thermal shock or other energy input can also be used to release the core contents.

SUMMARY OF THE INVENTION

Figure 1:
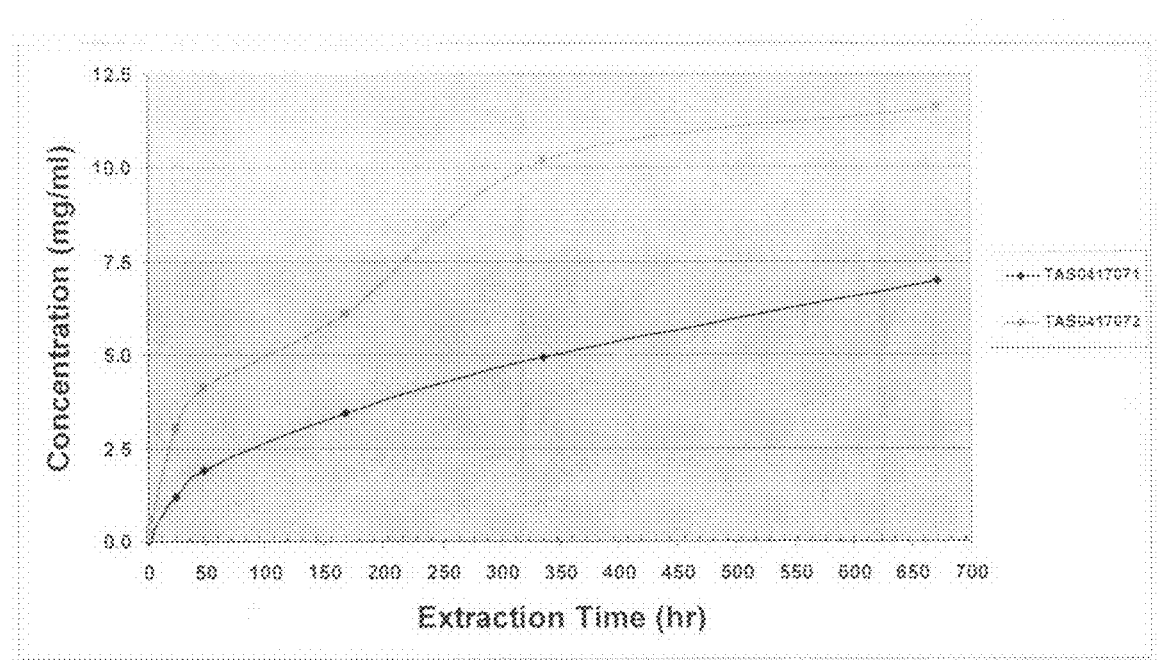
FIGS. 1, 2, 3, 4, and 5 are graphs of permeability characteristics of microcapsules according to the invention presented as the concentration of extracted core material over time.

The invention teaches a new process of microencapsulation and the microcapsules and the particles produced by the process. The particles can be selected to have low permeability. In one aspect the invention is a process for forming microcapsules of selected permeability, the process comprising preparing a core material including the desired core, an oil and an initiator; preparing a first composition comprising a reaction product of i) an oil soluble or dispersible amine with ii) a multifunctional acrylate or methacrylate monomer or oligomer, an oil soluble acid and an initiator, and reacting the first composition at a first temperature; adding the core material to the first composition; preparing a second composition comprising an anionic emulsifier comprising a water soluble or water dispersible acrylic acid alkyl acid copolymer, water, optionally a water phase initiator, and an alkali or alkali salt, adding the second composition to the first composition and stirring to form droplets of the core material dispersed in the first composition; and, applying heat to initiate wall formation around the droplets thereby forming microcapsules. In one aspect the core material oil can act as solvent for the oil soluble constituents. The core material oil can be solvent for the amine, the acrylate or methacrylate or oligomers, and for the oil soluble acid. Alternatively, these oil soluble constituents can be dispersed in an oil separate or distinct from the core material oil.

In another aspect the first composition comprises the reaction product of an oil soluble or dispersible secondary or tertiary amine. Primary amines can also be employed if the molecular weight is sufficiently high such as with larger molecular weight alkyl groups (>7 carbons) such that the amine has some degree of oil solubility. In yet another aspect the process involves preparing the first composition which comprises preparing the reaction product of an aminoalkyl acrylate, aminoalkyl methacrylate, diethylaminoethyl methacrylate, dimethylaminoethyl methacrylate, or tertiary butyl aminoethyl methacrylate, and an oil soluble acid and an initiator. In yet another aspect, preparing the core material can comprise blending a material selected from the group consisting of chromogen, dye, perfume, flavorant, sweetener, oil, pigment, pharmaceutic, moldicide, herbicide, fertilizer, phase change material, or adhesive with an oil.

In yet another aspect, the invention teaches a low permeability microcapsule particle comprising an oil soluble or dispersible core material and a wall material at least partially surrounding the core material, the microcapsule wall material comprising the reaction product of a first composition in the presence of a second composition comprising an anionic emulsifier, the first composition comprising a reaction product of i) an oil soluble or dispersible amine with ii) a multifunctional acrylate or methacrylate monomer or oligomer, an oil soluble acid and an initiator, the anionic emulsifier comprising a water soluble or water dispersible acrylic acid alkyl acid copolymer, optionally a water phase initiator, and an alkali or alkali salt, whereby the reaction product of the first composition and second composition results in the formation of a low permeability microcapsule wall. The first composition constituents can be dispersed in the oil of the prepared core material or in a separate oil. Preferably the microcapsules have low permeance to the core material. In another aspect, preferably the amine is a secondary or tertiary amine, or an amine oligomer. More preferably, the amine is an aminoalkyl acrylate or aminoalkyl methacrylate, and is selected from diethylaminoethyl methacrylate, tertiarybutyl aminoethylmethacrylate, or dimethylaminoethyl methacrylate. Desirably the formed microcapsules have a percent of free oil of less than 4% when tested by the method described in the examples.

In one aspect, in certain applications the microcapsules in addition usefully include a binder and a substrate material onto which the microcapsules are adhered.

DETAILED DESCRIPTION

The present invention teaches a low permeability microcapsule particle comprising a core material and a wall material at least partially surrounding, and preferably completely surrounding a core material. The microcapsule wall is a reaction product of an oil soluble or dispersible primary, secondary, or tertiary amine with a multifunctional acrylate or methacrylate monomer or oligomer and an oil soluble acid and an initiator.

The second composition is an anionic emulsifier and comprises a water soluble or water dispersible acrylic acid alkyl acid copolymer, usually at least one water phase initiator and one or more of an alkali or alkali salt. By water phase initiator, it is meant that the initiator is soluble or dispersible in water.

The reaction of the first composition in the presence of the second composition results in the formation of a low permeability microcapsule wall.

The amines can include by way of illustration and not limitation amine modified vinyl monomers including amine modified acrylates or methacrylates such as mono or diacrylate amines, mono or dimethacrylate amines, amine modified polyetheracrylates and amine modified polyethermethacrylates, aminoalkyl acrylates or aminoalkyl methacrylate.

The amines can include primary, secondary or tertiary amines and can include tertiary butyl aminethylmethacrylate, diethylaminoethyl methacrylate, or dimethylaminoethyl methacrylate.

Multifunctional acrylate or methacrylate monomers or oligomers can include mono-; di-; tri-; tetra- penta-; hexa-; hepta-; or octa-functional acrylate esters, methacrylate esters and multi-functional polyurethane acrylate esters and epoxy acrylates stable in the presence of initiator. Monomers shall be understood as including oligomers thereof. Optionally, an inhibitor such as hydroquinone can be added to the monomer and initiator blend in the capsules to prevent premature polymerization.

Useful monomers in the invention are di- and poly-functional acrylate esters, difunctional (meth)acrylate esters, polyfunctional (meth)acrylate esters, difunctional urethane acrylate esters, polyfunctional urethane acrylate esters and polyfunctional and difunctional epoxy acrylate monomers and oligomers used alone or in combination as blends. In alternate embodiments, optionally, the di- and polyfunctional acrylates, methacrylates, urethane acrylates, and epoxy acrylates are further blended with monofunctional acrylates, methacrylates, urethane acrylates and epoxy acrylates.

In an aspect of the invention multi-functional acrylate or methacrylate monomers or oligomers preferably are selected to have a Tg>60° C. in one aspect greater than 70° C., and in another aspect greater than 80° C., and can include by way of illustration and not limitation, allyl methacrylate; triethylene glycol dimethacrylate; ethylene glycol dimethacrylate, diethylene glycol dimethacrylate, aliphatic or aromatic urethane diacrylates, difunctional urethane acrylates, ethoxylated aliphatic difunctional urethane methacrylates, aliphatic or aromatic urethane dimethacrylates, epoxy acrylates, epoxymethacrylates; tetraethylene glycol dimethacrylate; polyethylene glycol dimethacrylate; 1,3 butylene glycol diacrylate; 1,4-butanediol dimethacrylate; 1,4-butaneidiol diacrylate; diethylene glycol diacrylate; 1,6 hexanediol diacrylate; 1,6 hexanediol dimethacrylate; neopentyl glycol diacrylate; polyethylene glycol diacrylate; tetraethylene glycol diacrylate; triethylene glycol diacrylate; 1,3 butylene glycol dimethacrylate; tripropylene glycol diacrylate; ethoxylated bisphenol diacrylate; ethoxylated bisphenol dimethylacrylate; dipropylene glycol diacrylate; alkoxylated hexanediol diacrylate; alkoxylated cyclohexane dimethanol diacrylate; propoxylated neopentyl glycol diacrylate, trimethylolpropane trimethacrylate; trimethylolpropane triacrylate, pentaerythritol triacrylate, ethoxylated trimethylolpropane triacrylate, propoxylated trimethylolpropane triacrylate, propoxylated glyceryl triacrylate, ditrimethylolpropane tetraacrylate, dipentaerythritol pentaacrylate, ethoxylated pentaerythritol tetraacrylate.

The oil soluble acid is preferably an organic acid. The organic acid can be selected from various acids such as carboxy acids, with monoalkyl maleates such as monomethyl, monoethyl or monobutyl maleate being preferred, with monobutyl maleate being most preferred. Other preferred organic acids include beta-carboxyethyl acrylate. Yet other organic acids that can be usefully employed in the invention include, organic sulfonic acids such as alkyl benezene sulfonic acid, more particularly linear alkyl benzene sulfonic acid, tridecylbenzene sulfonic acid, more particularly linear trialkyl benzene sulfonic acid such as linear tridecyl benzene sulfonic acid, alkyldiphenyloxide sulfonic acid, preferably dodecyl diphenyl oxidedisulfonic acid, more particularly branched C12 diphenyl oxide disulfonic acid, alkylbenzene sulfonic acid, more particularly, dodecyl benzene sulfonic acid, dialkyl naphthalene disulfonic acid, more particularly dinonyinaphthalene disulfonic acid, 4-hydrozino benzene sulfonic acid acrylic acid, methacrylic acid, and the like. Desirably the organic acid is selected to be dispersible in the oil phase and sparingly soluble in the water phase. The organic acid is used as 0.1 to 20%, preferably 3 to 10.0%, and more preferably 5.0-7.0% by weight based on percentage of total wall.

Anionic emulsifiers include by way of illustrating and not limitation, water-soluble salts of alkyl sulfates, alkyl ether sulfates, alkyl isothionates, alkyl carboxylates, alkyl sulfosuccinates, alkyl succinamates, alkyl sulfate salts such as sodium dodecyl sulfate, alkyl sarcosinates, alkyl derivatives of protein hydrolyzates, acyl aspartates, alkyl or alkyl ether or alkylaryl ether phosphate esters, sodium dodecyl sulphate, phospholipids or lecithin, or soaps, sodium, potassium or ammonium stearate, oleate or palmitate, alkylarylsulfonic acid salts such as sodium dodecylbenzenesulfonate, sodium dialkylsulfosuccinates, dioctyl sulfosuccinate, sodium dilaurylsulfosuccinate, poly(styrene sulfonate) sodium salt, alkylene-maleic anhydride copolymers such as isobutylene-maleic anhydride copolymer, or ethylene maleic anhydride copolymer gum arabic, sodium alginate, carboxymethylcellulose, cellulose sulfate and pectin, poly(styrene sulfonate), pectic acid, tragacanth gum, almond gum and agar; semi-synthetic polymers such as carboxymethyl cellulose, sulfated cellulose, sulfated methylcellulose, carboxymethyl starch, phosphated starch, lignin sulfonic acid; maleic anhydride copolymers (including hydrolyzates thereof), polyacrylic acid, polymethacrylic acid, acrylic acid alkyl acrylate copolymers such as acrylic acid butyl acrylate copolymer or crotonic acid homopolymers and copolymers, vinylbenzenesulfonic acid or 2-acrylamido-2-methylpropanesulfonic acid homopolymers and copolymers, and partial amide or partial ester of such polymers and copolymers, carboxymodified polyvinyl alcohol, sulfonic acid-modified polyvinyl alcohol and phosphoric acid-modified polyvinyl alcohol, phosphated or sulfated tristyrylphenol ethoxylates. The amount of anionic emulsifier is anywhere from about 0.1 to about 40 percent by weight of all constituents, more preferably from 0.5 to about 10 percent, most preferably 0.5 to 5 percent by weight. Typically emulsifier is employed at 0.2 to about 10% by weight based on percentage of the total formulation.

Excluding solvent, the primary, secondary or tertiary amine acrylate or methacrylate and the multi-functional acrylate or methacrylate monomers are used in a relative ratio of from about 0.1:99.9 to about 10:90 preferably from about 0.5:99.5 to about 5:95, and most preferably 1:99 to about 3:97.

For example, in the process of making the capsules, assuming a system of about 800 grams with solvent, the largest constituents are typically solvent, 10 to 70 weight percent, preferably 25 to 55 weight percent oil phase solvent and oil; 10 to 70 weight percent, preferably 35 to 65 weight percent water; 0.01 to 1 weight percent, preferably 0.025 to about 0.5 weight percent, more preferably 0.05 to 0.25% amine, preferably 0.1 to 10 weight percent, usually 0.5 to 8 weight percent multi-functional acrylate or methacrylate monomer or oligomer; oil to 20 weight percent. Initiator is 10% or less, usually about 5% or less, preferably 2% by weight or less and more preferably 1% or less. Low molecular weight secondary or tertiary amines can be also employed as the amine provided they are oil soluble or dispersible.

Preferred initiators include peroxy initiators, azo initiators, peroxides, and compounds such as 2,2'-azobismethylbutyronitrile, dibenzoyl peroxide. More particularly, and without limitation the free radical initiator can be selected from the group of initiators comprising an azo or peroxy initiator, such as peroxide, dialkyl peroxide, alkyl peroxide, peroxyester, peroxycarbonate, peroxyketone and peroxydicarbonate, 2,2'-azobis(isobutyinitrile), 2,2'-azobis(2,4-dimethylpentanenitrile), 2,2'-azobis (2,4-dimethylvaleronitrile), 2,2'-azobis(2-methylpropanenitrile), 2,2'-azobis(methylbutyronitrile), 1,1'-azobis(cyclohexanecarbonitrile), 1,1'-azobis(cyanocyclohexane), benzoyl peroxide, decanoyl peroxide; lauroyl peroxide; benzoyl peroxide, di(n-propyl)peroxydicarbonate, di(sec-butyl)peroxydicarbonate, di(2-ethylhexyl)peroxydicarbonate, 1,1-dimethyl-3-hydroxybutyl peroxyneodecanoate, α-cumyl peroxyneoheptanoate, t-amyl peroxyneodecanoate, t-butyl peroxyneodecanoate, t-amyl peroxypivalate, t-butyl peroxypivalate, 2,5-dimethyl 2,5-di (2-ethyihexanoyl peroxy)hexane, t-amyl peroxy-2-ethylhexanoate, t-butyl peroxy-2-ethylhexanoate, t-butyl peroxyacetate, di-t-amyl peroxyacetate, t-butyl peroxide, di-t-amyl peroxide, 2,5-dimethyl-2,5-di-(t-butylperoxy)hexyne-3, cumene hydroperoxide, 1,1-di-(t-butylperoxy)-3,3,5-trimethyl-cyclohexane, 1,1-di-(t-butylperoxy)-cyclohexane, 1,1-di-(t-amylperoxy)-cyclohexane, ethyl-3,3-di-(t-butylperoxy)-butyrate, t-amyl perbenzoate, t-butyl perbenzoate, ethyl 3,3-di-(t-amylperoxy)-butyrate, and the like. Blends of initiators can also be employed. Initiators are available commercially, such as Vazo initiators, which typically indicate a decomposition temperature for the initiator. Preferably the initiator is selected to have a decomposition point of about 50° C. or higher. Usefully multiple initiators are employed, either as a blend in the oil phase, or in either of the oil or water phases. Preferably initiators are selected to stagger the decomposition temperatures at the various steps, pre-polymerization, wall formation and hardening or polymerizing of the capsule wall material. For example, a first initiator in the oil phase can decompose at 55° C., to promote prepolymer formation, a second can decompose at 60° C. to aid forming the wall material. Optionally a third initiator can decompose at 65° C. to facilitate polymerization of the capsule wall material. The total amount of initiator can be typically as low as 0.1 weight percent or as high as 10 weight percent.

Internal phase oils, or oil phase, or oil solvent or "nonsolvent for the water phase," used interchangeably for purposes hereof can be selected from solvents and the solvents can include by way of illustration and not limitation, ethyldiphenylmethane, butyl biphenyl ethane, benzylxylene, alkyl biphenyls such as propylbiphenyl and butylbiphenyl, dialkyl phthalates e.g. dibutyl phthalate, dioctylphthalate, dinonyl phthalate and ditridecylphthalate; 2,2,4-trimethyl-1,3-pentanediol diisobutyrate, alkyl benzenes such as dodecyl benzene; alkyl or aralkyl benzoates such as benzyl benzoate; diaryl ethers, di(aralkyl)ethers and aryl aralkyl ethers, ethers such as diphenyl ether, dibenzyl ether and phenyl benzyl ether, liquid higher alkyl ketones (having at least 9 carbon atoms), alkyl or aralky benzoates, e.g., benzyl benzoate, alkylated naphthalenes such as dipropylnaphthalene, partially hydrogenated terphenyls; high-boiling straight or branched chain hydrocarbons, alkaryl hydrocarbons such as toluene, vegetable oils such as canola oil, soybean oil, corn oil, sunflower oil, or cottonseed oil, methyl esters of fatty acids derived from transesterification of canola oil, soybean oil, cottonseed oil, corn oil, sunflower oil, pine oil, lemon oil, olive oil, or methyl ester of oleic acid, vegetable oils, esters of vegetable oils, e.g. soybean methyl ester, straight chain saturated paraffinic aliphatic hydrocarbons of from 10 to 13 carbons. Mixtures of the above can also be employed. Common diluents such as straight chain hydrocarbons can also be blended with the solvents, or blend of solvents. The solvent is selected on the basis of hydrophobicity and ability to disperse or solvate the amine modified vinyl monomer and the multifunctional acrylate or methacrylate monomer or oligomer. "Internal phase oil" is herein to described as a type of oil material commonly able to be used as the oil in conventional microencapsulation. In conventional microencapsulation, the internal phase oil ends up as the core or internal contents of the microcapsule.

The microencapsulation process in certain of the embodiments is believed to rely on the organic acid for formation of a changed species that drives the wall material to the oil/water interface.

The size of the capsules can be controlled by adjusting the speed of agitation. Smaller size dispersions are achieved through faster agitation resulting in smaller capsules.

Emulsifying agents or protective colloids can be conveniently employed to facilitate dispersion. Such materials for example include carboxylated or partially hydrolyzed polyvinyl alcohol, methyl cellulose, and various latex materials, stearates, lecithins, and various surfactants.

The microcapsules according to the invention can be used to microencapsulate various core materials such as chromogens and dyes, flavorants, perfumes, sweeteners, fragrances, oils, fats, pigments, cleaning oils, pharmaceuticals, pharmaceutical oils, perfume oils, mold inhibitors, antimicrobial agents, adhesives, phase change materials, scents, fertilizers, nutrients, and herbicides by way of illustration and without limitation. The core can be liquid or even solid. With cores that are solid at ambient temperatures, the wall material can usefully enwrap less than the entire core for certain applications where availability of, for example, an agglomerate core is desired on application. Such uses can include scent release, cleaning compositions, emollients, cosmetic delivery and the like.

Microencapsulation can facilitate processing by increasing particle size or by converting liquids into free flowing solids. The largest volume applications of microcapsules are in imaging systems such as carbonless papers.

The microcapsule wall can serve the purpose of extending shelf life, stabilize and protect the core material, mask strong flavors, or protect contents so that they are available to participate in reactions such as imaging or adhesive formation when the capsule wall is ruptured, sheared, fractured, broken or melted.

The core material can be a minor or major constituent of the material encapsulated by the microcapsules. If the core material can function as the oil solvent in the capsules, it is possible to make the core material the major or total material encapsulated. Usually however, the core material is from 0.01 to 99 weight percent of the capsule internal contents, preferably 0.01 to about 65 by weight of the capsule internal contents, and more preferably from 0.1 to about 45% by weight of the capsule internal contents. With certain applications, the core can be effective even at just trace quantities.

In the process of the invention a first composition is prepared as an oil phase #1. The temperature of this oil phase is brought to a wall pre-reaction temperature. A nitrogen blanket is preferably employed and the solution mixed with high shear agitation to disperse the droplets. Gradually the temperature is increased to create a first composition reaction product.

A second oil phase is prepared and held at a pre-reaction temperature of the initiator.

The two oil solutions are allowed to pre-react and are combined. The mixtures are stirred and held at the pre-reaction temperature for sufficient time to pre-react the wall material. After the pre-reaction step, the water phase is added to the oil solutions.

After wall pre-reaction, a water phase is prepared and added carefully to the oil solution. The solutions are milled and heated for a sufficient time to allow wall deposition to proceed. This process is further illustrated and explained in the examples.

In an alternative embodiment, in the first composition, and/or in the anionic emulsifier the initiator can be an energy-activated initiator, such as a UV or light induced or electron beam induced free radical. Optionally a visible light induced free radical generator could also be used. This dispersion is then subjected to UV light to generate free radicals and initiate polymerization. Depending on the type of initiator or initiators, the dispersion is subjected to UV light and/or heated (as appropriate to the initiator or initiators) to generate free radicals.

As polymerization progresses, microcapsule wall material forms at the interface of the water and oil phases. UV exposure and/or heating steps can be used to further polymerize or harden the formed wall material.

UV initiators can include ketone compounds and can include benzophenone; acetophenone; benzil; benzaldehyde; o-chlorobenzaldehyde; xanthone; thioxanthone; 9,10-anthraquinone; 1-hydroxycyclohexyl phenyl ketone; 2,2-diethoxyacetophenone; dimethoxyphenylacetophenone; methyl diethanolamine; dimethylaminobenzoate; 2-hydroxy-2-methyl-1-phenylpropane-1-one; 2,2-di-sec-butoxyacetophenone; 2,2-dimethoxy-1,2-diphenylethan-1-one; dimethoxyketal; and phenyl glyoxal 2,2'-diethoxyacetophenone; hydroxycyclohexyl phenyl ketone; alpha-hydroxyketones; alpha-amino-ketones; alpha and beta naphthyl carbonyl compounds; benzoin ethers such as benzoin methyl ether; benzyl; benzil ketals such as benzil dimethyl ketal; acetophenone; fluorenone, 2-hydroxy-2-methyl-1-phenylpropan-1-one. UV initiators of this kind are available commercially, e.g., IRGACURE 184™ or DEROCURE 1173™ from Ciba. Thermal initiators are available from DuPont. The fraction of the photo initiator in any of the water or oil phase is approximately from about 0.1 to 10%, preferably 0.25 to about 6% by weight, more preferably 0.5 to 2.5 weight percent. Similar weight percent ranges can also be applied to the thermal initiators.

UV initiators can be included in substitution as an alternate initiator system (for any heating step or steps of the encapsulation process, or as an additional initiator system) In a yet further embodiment, for specialized microencapsulation processes, the use of initiators, e.g., thioxanthones, phosphine oxides, metallocenes, tertiary aminobenzenes or tertiary aminobenzophenones, which break down into free radicals on exposure to visible light is effectively used. Such microencapsulation systems however typically require special handling of the system to prevent premature polymerization or oligomerization by appropriate control of lighting conditions.

This produces an initiator system for polymerization or oligomerization using a dual cure method or optional thermal or optional light or optional UV initiated method by appropriate selection of initiator and initiation method or methods. In an alternative embodiment of the invention, azo compounds that can be excited or split by UV light or high-energy radiation are used alone or in combination with thermal free radical initiators. In a yet alternative embodiment, the combination of thermal and UV initiators is formed only by azo compounds.

In a yet further embodiment, for specialized microencapsulation processes, the use of initiators, e.g., thioxanthones, phosphine oxides, metallocenes, tertiary aminobenzenes or tertiary aminobenzophenones, which break down into free radicals on exposure to visible light is effectively used. Such microencapsulation systems however typically require special handling of the system to prevent premature polymerization or oligomerization by appropriate control of lighting conditions.

For light activated microencapsulation, the use of UV initiators are preferred, or a combination of UV initiators and thermal free radical initiators. This combination can impart considerable versatility to the microencapsulation steps of the process where any step or steps of the microencapsulation process then can be initiated either by appropriate selection of an initiator decomposing at specific temperatures or decomposing under specific light conditions. This versatility in the selection of initiators also allows sufficient flexibility in the encapsulation system to customize encapsulation conditions for a given core material. For example, highly volatile or heat-sensitive materials may be more effectively encapsulated with minimal heating, through the use of energy-cure methods.

In a yet further embodiment, with appropriate selection of monomers and initiators, the respective monomers in the process can be polymerized or oligomerized using some suitable means such as heat (used with thermal initiators) or UV light (for use with UV initiators), or electron beam. When replacing the UV radiation with electron beam, the addition of initiators is not absolutely essential or amounts employed can be reduced. Options for individual initiation steps of the encapsulation process include the freedom to use in replacement of any heating step, the use of visible light with suitable initiators, the use of UV light with suitable UV initiators, or ionizing radiation (e.g. electron beam or gamma ray) without initiators or reduced amounts of initiator.

UV initiators may be selected from those organic chemical compounds conventionally employed to promote UV-initiated formation of radicals. A preferred UV initiator is 1-hydroxycyclohexyl phenyl ketone because of the rapidity with which it generates free radicals when exposed to UV radiation. Mixtures of UV initiators or mixtures with thermal initiators may also be used. This is often desirable because it provides more efficient production of radicals in certain cases. In general, the UV initiator will be present in an amount of 0.1 to 10.0 weight percent in any of the water or oil phases, based on the total weight of all constituents. However, it is preferable to use between 0.25-2.5 weight percent UV initiator, most preferably 0.5-1.0 weight percent UV initiator, based on total weight.

The amount of each initiator, thermal, UV or light, that is employed can vary, and is dependent upon factors such as the monomer or oligomer material. Typically, the amount of initiator ranges from about 0.1 to about 6 percent, and often about 1 to about 3 percent, based on the weight of all constituents.

A process of microencapsulation based on UV curing has the advantage of allowing the encapsulation of highly volatile or heat sensitive core materials. UV curable wall systems can have lower energy usage than analogous thermal—cured systems. In certain aspects, a UV-curable system has the potential of increased throughput and efficiency through use of photo initiation.

Various combinations of initiator usage are present. The first composition can include a thermal initiator or optionally a UV initiator, or both. Similarly the anionic emulsifier of the second composition can include a thermal initiator or optionally a UV initiator, or both. In an alternate aspect of the invention the initiators are UV initiators.

Microcapsule particles according to the invention, by selection of curing conditions, wall materials, initiators, and concentration can select for a desired permeance level allowing formation of capsules with more targeted release profiles appropriate to the end use application. The process of the invention enables manufacture of capsules with different permeability levels. Permeability is conveniently expressed as release of less than a certain quantity of core material over a given time frame. For example, low permeability would be release of less than 1.0 mg/ml at 48 hours extraction time, or less than 2 mg/ml at 1 week extraction time or less than 5 mg/ml at four weeks extraction time. The desired end use application often will dictate the target release rate deemed acceptable to meet the needs of the application.

Example 1

General Capsule Preparation Procedure

Pre-Reaction of Wall Material:

The following general procedure is used to prepare microcapsules using the materials and methods detailed in Examples 2 to 62. Oil phase #1 is prepared, and the temperature of this oil phase is maintained at the wall pre-reaction temperature. Oil phase #2 is prepared and placed in a steel jacketed reactor at a starting temperature (usually 35° C.). Mixing is done with a 2", 4-tip, flat mill blade at 1000 rpm, and a nitrogen blanket is applied at 300 cc/min. The temperature of oil phase #2 is increased from the starting temperature to the initiator pre-reaction temperature in 30 minutes. Oil phase #2 is held at the initiator pre-reaction temperature for a defined time period, and then oil phase #1 is added and held for a second defined time period. If the wall pre-reaction temperature is different from the initiator pre-reaction temperature, the wall pre-reaction temperature is achieved by (usually) cooling to the second temperature in 60 minutes. Then oil phase #1 is added.

Batch Preparation:

After the wall pre-reaction has been completed, the water phase (which has been prepared in advance by combining all materials and stirring with a magnetic stir bar to dissolve the water-soluble initiator) is added to the oil solution without excessively disturbing the oil layer. Milling is then started at a speed greater than the pre-reaction mixing speed, and is continued. After milling the mixer is replaced with a 3" propeller and mixing is usually done at 400 rpm. The batch is either held at the milling temperature for an additional time period or the temperature can be elevated and held at one or more additional temperatures to allow complete wall reaction.

In the following examples the abbreviations correspond to the following materials:

|  | Company/City |  |
|---|---|---|
| BPO |  | Dibenzoyl Peroxide |
| CN371 | Sartomer Company, Exton, PA | Amine-Modified Acrylate Oligomer |
| CN551 | Sartomer Company, Exton, PA | Amine Modified Polyether Acrylate Oligomer |
| CN997 | Sartomer Company, Exton, PA | Hexafunctional Aromatic Urethane Acrylate Oligomer |
| Colloid 121 | Rhone-Poulenc, Cedex, France | Polyacrylic Acid Solution |
| Colloid 351 | Rhone-Poulenc, Cedex, France | Copolymer of 92% Polyacrylic Acid/8% Butyl Acrylate |
| DEAEMA | Zizhu Pharmaceutical, Germany | Diethylaminoethyl Methacrylate |
| DMAEMA | Zizhu Pharmaceutical, Germany | Dimethylaminoethyl Methacrylate |
| Norpar-12 | Exxon Mobil, Irving, TX | Normal Paraffin Oil |
| Oleocol ME-130 |  | Soybean Oil, Methyl Ester |
| SR206 | Sartomer Company, Exton, PA | Ethylene Glycol Dimethacrylate |
| SR244 | Sartomer Company, Exton, PA | Pentaerythritol Triacrylate |
| SR248 | Sartomer Company, Exton, PA | Neopentyl Glycol Dimethacrylate |
| SR295 | Sartomer Company, Exton, PA | Pentaerythritol Tetraacrylate |
| SR355 | Sartomer Company, Exton, PA | Di-Trimethylolpropane Tetraacrylate |
| TBAEMA |  | Tertiarybutyl Aminoethyl Methacrylate |
| Vazo-52 | DuPont, Wilmington, DE | 2,2'-Azobis (2,4-Dimethylvaleronitrile) |
| Vazo-67 | DuPont, Wilmington, DE | 2,2'-Azobis (2-Methylbutyronitrile) |
| Vazo-68WSP | DuPont, Wilmington, DE | 4,4'-Azobis (4-Cyanovaleric Acid) |
| MBM | Bimax, Glen Rock, PA | Monobutyl Maleate |
| Irgacure 651 | CIBA, Tarrytown, NY | 2,2-Dimethoxy-1,2-Diphenylethan-1-one |
| Darocure 1173 | CIBA, Tarrytown, NY | 2-Hydroxy-2-Methyl-1-Phenyl-Propane-1-one |
| Beta-C | Bimax, Glen Rock, PA | Beta-carboxyethyl acrylate |

Procedure for Determination of Free Oil

This method measures the amount of oil in the water phase and uses as an internal standard solution 1 mg/ml dibutyl phthalate (DBP)/hexane.

Weigh a little more than 250 mgs of DBP into a small beaker and transfer to a 250 ml volumetric rinsing the beaker thoroughly. Fill with hexane to 250 mls.

Sample Prep: Weigh approximately 1.5-2 grams (40 drops) of the capsule slurry into a 20 ml scintillation vial and add 10 ml's of the ISTD solution, cap tightly. Shaking vigorously several times over 30 minutes, pipette solution into an autosampler vial and analyze by GC.

Instrumentation: HP5890 GC connected to HP Chem Station Software

Column: 5 m×0.32 mm id with 1 μm DB-1 liquid phase

Temp: 50 deg for 1 minute then heat to 320 deg @15 deg/min

Injector: 275° C., Detector: 325° C.

2 ul injection

Calculation: Add total peak area minus the area for the DBP for both the sample and calibration. Calculate mg of free core oil:

$$\frac{\text{Total area from sample}}{\text{Total area from calibration}} \times \text{mg of oil calibration solution} =$$

$$\text{mg of free oil}$$

Calculate % free oil:

$$\frac{\text{Mg of free core oil}}{\text{Sample wt. (mg)}} \times 10^2 = \% \text{ free oil in wet slurry}$$

Determination of Extractives Over Time

1. Load a reference calibration curve for the encapsulated oil.
2. Zero the spectrophotometer with hexane.
3. Vigorously shake the slurry to ensure homogeneous mixing of the material. If necessary break up any caking that has occurred with a plastic rod.

4. Use a constant dry weight of capsules.
5. Measure ml of deionized water with a measuring cylinder into a 150 ml beaker.
6. Add capsule slurry into a 15 ml beaker.
7. Swirl content well to produce a uniformly colored homogeneous suspension.
8. Measure 50 ml of hexane using a measuring cylinder and gently add to each of the aqueous suspensions (6.6).
9. Start the timer.
10. Using a transfer pipette take the initial aliquot from the upper hexane layer at t–5 mins and transfer into the glass cuvette.
11. Measure the UV absorbance of the sample.
12. Repeat steps 10-11 at t=5 minutes, 1 hour, 2 hours, 24 hours, 48 hours, 1 week, 2 weeks and 4 weeks. Note: If the initial absorbance is above 1, perform an additional 10× dilution of the sample in hexane and rerun.
Instrument: Agilent 8453 UV visible spectroscope Procedure for Determining Permeability Prepare capsules with an indicator in the core. Apply the capsules as a slurry coating onto a paper substrate at the rate of (1 to 3 pounds (453 grams to 1360 grams) per 3300 sq. ft. ream (306.57 sq. meters). Obtain 3"×3" (7.62 cm×7.62 cm) sample of coated paper. Divide the sample into four pieces of equivalent area.

Acclimate and conduct test in a TAPPI conditioned room. Place sample in an Erhenmeyer flask. Add 20 ml toluene. Allow to extract 10 minutes with occasional stirring. Transfer the 20 ml aliquot to a 50 ml volumetric flask. (10 g $SnCL_4$, $5H_2O$/500 ml solvent) add 5 mls of the stannic chloride solution to the volumetric flask. Dilute to 50 mls with toluene. Allow color to develop. Measure the % transmission on a B+L Spectronic 20 at a wavelength of 455 nm.

Using a calibration chart, calculate mg of indicator per 50 ml.

Calculate % permeability as $$\frac{\text{mg indicator} \times 100}{\text{sample size}} = \% \text{ permeability}$$

OR $$\frac{\text{mg indicator}}{\text{sample size}} = \text{mg/sample area}$$

| Identifiers | Example 2 TAS0409071 | Comparative Example 3 TAS0410071 | Example 4 TAS0411071 | Example 5 TAS0411072 | Example 6 TAS0412071 |
|---|---|---|---|---|---|
| Oil Phase 1 Conditions | | | | | |
| Amine Monomer | TBAEMA | CN371 | TBAEMA | TBAEMA | TBAEMA |
| Amine Monomer Level (g) | 0.9 | 3.0 | 0.9 | 0.9 | 0.9 |
| Wall Monomer #1 | SR248 | SR248 | SR444 | SR444 | SR444 |
| Wall Monomer #1 Level (g) | 24.1 | 22.0 | 24.1 | 24.1 | 24.1 |
| Wall Monomer #2 | n/a | n/a | n/a | n/a | n/a |
| Wall Monomer #2 Level (g) | n/a | n/a | n/a | n/a | n/a |
| Acid | MBM | MBM | MBM | MBM | MBM |
| Acid Level (g) | 2.5 | 2.5 | 2.5 | 2.5 | 2.5 |
| Oil | Oleocal ME-130 | Olecol ME-130 | Cedarwood Oil | Peppermint Oil | Lemon Oil |
| Oil Level (g) | 125.0 | 125.0 | 50.0 | 50.0 | 50.0 |
| Oil Phase 2 Conditions | | | | | |
| Oil | Oleocal ME-130 | Oleocal ME-130 | Cedarwood Oil | Peppermint Oil | Lemon Oil |
| Oil Level (g) | 125.0 | 125.0 | 200.0 | 200.0 | 200.0 |
| Free Radical Initiator #1 | Vazo-52 | Vazo-52 | Vazo-52 | Vazo-52 | Vazo-52 |
| Free Radical Initiator #1 Level (g) | 2.0 | 2.0 | 2.0 | 2.0 | 2.0 |
| Free Radical Initiator #2 | Vazo-67 | Vazo-67 | Vazo-67 | Vazo-67 | Vazo-67 |
| Free Radical Initiator #2 Level (g) | 1.0 | 1.0 | 1.0 | 1.0 | 1.0 |
| Water Phase Conditions | | | | | |
| Emulsifier | Colloid 351 | Colloid 351 | Colloid 351 | Colloid 351 | Colloid 351 |
| Emulsifier Solids (%) | 25.0 | 25.0 | 25.0 | 25.0 | 25.0 |
| Emulsifier Level (g) | 25.0 | 25.0 | 25.0 | 25.0 | 25.0 |
| 20% NaOH Level (g) | 5.0 | 5.0 | 5.0 | 5.0 | 5.0 |
| Water Level (g) | 500.0 | 500.0 | 500.0 | 500.0 | 500.0 |
| Water Phase Initiator | Vazo-68WSP | Vazo-68WSP | Vazo-68WSP | Vazo-68WSP | Vazo-68WSP |
| Water Phase Initiator Level (g) | 2.0 | 2.0 | 2.0 | 2.0 | 2.0 |
| Water Phase pH | 5.21 | 5.34 | 5.26 | 5.33 | 5.33 |
| Pre-Reaction Conditions | | | | | |
| Vazo Pre-Reaction Time (minutes) | 120 | 120 | 120 | 120 | 120 |
| Vazo Pre-Reaction Temperature (° C.) | 60 | 60 | 60 | 60 | 60 |
| Wall Pre-Reaction Time (minutes) | 15 | 15 | 15 | 15 | 15 |
| Wall Pre-Reaction Temperature (° C.) | 60 | 60 | 60 | 60 | 60 |
| Milling Conditions | | | | | |
| Milling Temperature (° C.) | 60 | 60 | 60 | 60 | 60 |
| Milling Time (minutes) | 30 | 30 | 30 | 30 | 30 |
| Milling rpm | 2500 | 2500 | 2500 | 2500 | 2500 |
| End-of-mill Size (microns) | 20.28 | 9.00 | 14.54 | 13.50 | 15.69 |

-continued

| Reaction Conditions | | | | | |
|---|---|---|---|---|---|
| Hold Time #1 (hours) | 3.25 | 3.25 | 3.25 | 3.25 | 3.25 |
| Hold Temperature #1 (° C.) | 60 | 60 | 60 | 60 | 60 |
| Hold Time #2 (hours) | 8 | 8 | 8 | 8 | 8 |
| Hold Temperature #2 (° C.) | 90 | 90 | 90 | 90 | 90 |
| Hold Time #3 (hours) | n/a | n/a | n/a | n/a | n/a |
| Hold Temperature #3 (° C.) | n/a | n/a | n/a | n/a | n/a |
| Mean Size (um) | 21.23 | 9.85 | 16.44 | 19.59 | 17.92 |

| Identifiers | Example 7 TAS0412072 | Example 8 TAS0416071 | Example 9 TAS0416072 | Example 10 TAS0417071 | Example 11 TAS0417072 |
|---|---|---|---|---|---|
| Oil Phase 1 Conditions | | | | | |
| Amine Monomer | TBAEMA | TBAEMA | TBAEMA | TBAEMA | CN371 |
| Amine Monomer Level (g) | 0.9 | 0.9 | 0.9 | 0.9 | 3.0 |
| Wall Monomer #1 | SR444 | SR444 | SR444 | SR444 | SR444 |
| Wall Monomer #1 Level (g) | 24.1 | 24.1 | 24.1 | 24.1 | 22.0 |
| Wall Monomer #2 | n/a | n/a | n/a | n/a | n/a |
| Wall Monomer #2 Level (g) | n/a | n/a | n/a | n/a | n/a |
| Acid | MBM | MBM | MBM | MBM | MBM |
| Acid Level (g) | 2.5 | 2.5 | 2.5 | 2.5 | 2.5 |
| Oil | Fir Needle Oil | Citronella Oil | Lavender Oil | Oil Blend TAS041207* | Oil Blend TAS041207* |
| Oil Level (g) | 50.0 | 50.0 | 50.0 | 50.0 | 50.0 |
| Oil Phase 2 Conditions | | | | | |
| Oil | Fir Needle Oil | Citronella Oil | Lavender Oil | Oil Blend TAS041207* | Oil Blend TAS041207* |
| Oil Level (g) | 200.0 | 200.0 | 200.0 | 200.0 | 200.0 |
| Free Radical Initiator #1 | Vazo-52 | Vazo-52 | Vazo-52 | Vazo-52 | Vazo-52 |
| Free Radical Initiator #1 Level (g) | 2.0 | 2.0 | 2.0 | 2.0 | 2.0 |
| Free Radical Initiator #2 | Vazo-67 | Vazo-67 | Vazo-67 | Vazo-67 | Vazo-67 |
| Free Radical Initiator #2 Level (g) | 1.0 | 1.0 | 1.0 | 1.0 | 1.0 |
| Water Phase Conditions | | | | | |
| Emulsifier | Colloid 351 | Colloid 351 | Colloid 351 | Colloid 351 | Colloid 351 |
| Emulsifier Solids (%) | 25.0 | 25.0 | 25.0 | 25.0 | 25.0 |
| Emulsifier Level (g) | 25.0 | 25.0 | 25.0 | 25.0 | 25.0 |
| 20% NaOH Level (g) | 5.0 | 5.0 | 5.0 | 5.0 | 5.0 |
| Water Level (g) | 500.0 | 500.0 | 500.0 | 500.0 | 500.0 |
| Water Phase Initiator | Vazo-68WSP | Vazo-68WSP | Vazo-68WSP | Vazo-68WSP | Vazo-68WSP |
| Water Phase Initiator Level (g) | 2.0 | 2.0 | 2.0 | 2.0 | 2.0 |
| Water Phase pH | 5.39 | 5.33 | 5.35 | 5.31 | 5.39 |
| Pre-Reaction Conditions | | | | | |
| Vazo Pre-Reaction Time (minutes) | 120 | 120 | 120 | 120 | 120 |
| Vazo Pre-Reaction Temperature (° C.) | 60 | 60 | 60 | 60 | 60 |
| Wall Pre-Reaction Time (minutes) | 15 | 15 | 15 | 15 | 15 |
| Wall Pre-Reaction Temperature (° C.) | 60 | 60 | 60 | 60 | 60 |
| Milling Conditions | | | | | |
| Milling Temperature (° C.) | 60 | 60 | 60 | 60 | 60 |
| Milling Time (minutes) | 30 | 30 | 30 | 30 | 30 |
| Milling rpm | 2500 | 2500 | 2500 | 2500 | 2500 |
| End-of-mill Size (microns) | 13.64 | 6.99 | 8.71 | 10.77 | 6.09 |
| Reaction Conditions | | | | | |
| Hold Time #1 (hours) | 3.25 | 3.25 | 3.25 | 3.25 | 3.25 |
| Hold Temperature #1 (° C.) | 60 | 60 | 60 | 60 | 60 |
| Hold Time #2 (hours) | 8 | 8 | 8 | 8 | 8 |
| Hold Temperature #2 (° C.) | 90 | 90 | 90 | 90 | 90 |
| Hold Time #3 (hours) | n/a | n/a | n/a | n/a | n/a |
| Hold Temperature #3 (° C.) | n/a | n/a | n/a | n/a | n/a |
| Mean Size | 16.84 | 12.67 | 10.68 | 13.75 | 9.17 |

| Identifiers | Example 12 TAS0423072 | Comparative Example 13 TAS0424071 | Example 14 TAS0424072 | Example 15 TAS0501072 | Example 16 TAS0503072 |
|---|---|---|---|---|---|
| Oil Phase 1 Conditions | | | | | |
| Amine Monomer | TBAEMA | CN371 | TBAEMA | TBAEMA | TBAEMA |
| Amine Monomer Level (g) | 0.9 | 3.0 | 0.9 | 0.9 | 0.9 |
| Wall Monomer #1 | SR248 | SR248 | SR355 | SR444 | SR444 |
| Wall Monomer #1 Level (g) | 24.1 | 22.0 | 24.1 | 24.1 | 24.1 |
| Wall Monomer #2 | n/a | n/a | n/a | n/a | n/a |
| Wall Monomer #2 Level (g) | n/a | n/a | n/a | n/a | n/a |
| Acid | MBM | MBM | MBM | MBM | MBM |

-continued

| | | | | | |
|---|---|---|---|---|---|
| Acid Level (g) | 2.5 | 2.5 | 2.5 | 2.5 | 2.5 |
| Oil | 2% 16B in Oleocal ME-130 | 2% 16B in Oleocal ME-130 | 2% 16B in Oleocal ME-130 | Ethyl Myristate | Methyl Octanoate |
| Oil Level (g) | 125.0 | 125.0 | 125.0 | 50.0 | 50.0 |
| Oil Phase 2 Conditions | | | | | |
| Oil | 2% 16B in Oleocal ME-130 | 2% 16B in Oleocal ME-130 | 2% 16B in Oleocal ME-130 | Ethyl Myristate | Methyl Octanoate |
| Oil Level (g) | 125.0 | 125.0 | 125.0 | 200.0 | 200.0 |
| Free Radical Initiator #1 | Vazo-52 | Vazo-52 | Vazo-52 | Vazo-52 | Vazo-52 |
| Free Radical Initiator #1 Level (g) | 2.0 | 2.0 | 2.0 | 2.0 | 2.0 |
| Free Radical Initiator #2 | Vazo-67 | Vazo-67 | Vazo-67 | Vazo-67 | Vazo-67 |
| Free Radical Initiator #2 Level (g) | 1.0 | 1.0 | 1.0 | 1.0 | 1.0 |
| Water Phase Conditions | | | | | |
| Emulsifier | Colloid 351 | Colloid 351 | Colloid 351 | Colloid 351 | Colloid 351 |
| Emulsifier Solids (%) | 25.0 | 25.0 | 25.0 | 25.0 | 25.0 |
| Emulsifier Level (g) | 25.0 | 25.0 | 25.0 | 25.0 | 25.0 |
| 20% NaOH Level (g) | 5.0 | 5.0 | 5.0 | 5.0 | 5.0 |
| Water Level (g) | 500.0 | 500.0 | 500.0 | 500.0 | 500.0 |
| Water Phase Initiator | Vazo-68WSP | Vazo-68WSP | Vazo-68WSP | Vazo-68WSP | Vazo-68WSP |
| Water Phase Initiator Level (g) | 2.0 | 2.0 | 2.0 | 2.0 | 2.0 |
| Water Phase pH | 5.29 | 5.34 | 5.36 | 5.39 | 5.37 |
| Pre-Reaction Conditions | | | | | |
| Vazo Pre-Reaction Time (minutes) | 120 | 120 | 120 | 120 | 120 |
| Vazo Pre-Reaction Temperature (° C.) | 60 | 60 | 60 | 60 | 60 |
| Wall Pre-Reaction Time (minutes) | 15 | 15 | 15 | 15 | 15 |
| Wall Pre-Reaction Temperature (° C.) | 60 | 60 | 60 | 60 | 60 |
| Milling Conditions | | | | | |
| Milling Temperature (° C.) | 60 | 60 | 60 | 60 | 60 |
| Milling Time (minutes) | 30 | 30 | 30 | 30 | 30 |
| Milling rpm | 2500 | 2500 | 2500 | 2500 | 2500 |
| End-of-mill Size (microns) | 20.91 | 9.82 | 21.73 | 41.46 | 24.11 |
| Reaction Conditions | | | | | |
| Hold Time #1 (hours) | 3.25 | 3.25 | 3.25 | 5.25 | 5.25 |
| Hold Temperature #1 (° C.) | 60 | 60 | 60 | 60 | 60 |
| Hold Time #2 (hours) | 8 | 8 | 8 | 8 | 8 |
| Hold Temperature #2 (° C.) | 90 | 90 | 90 | 90 | 90 |
| Hold Time #3 (hours) | n/a | n/a | n/a | n/a | n/a |
| Hold Temperature #3 (° C.) | n/a | n/a | n/a | n/a | n/a |
| Mean Size (um) | 21.96 | 10.07 | 22.54 | 32.26 | 22.95 |

| Identifiers | Example 17 TAS0504072 | Example 18 TAS0507071 |
|---|---|---|
| Oil Phase 1 Conditions | | |
| Amine Monomer | DMAEMA (dimethylaminoethyl methacrylate) | DEAEMA (diethylaminoethyl methacrylate) |
| Amine Monomer Level (g) | 0.9 | 0.9 |
| Wall Monomer #1 | SR244 | SR444 |
| Wall Monomer #1 Level (g) | 24.1 | 24.1 |
| Wall Monomer #2 | n/a | n/a |
| Wall Monomer #2 Level (g) | n/a | n/a |
| Acid | MBM | MBM |
| Acid Level (g) | 2.5 | 2.5 |
| Oil | Cedarwood Oil | Cedarwood Oil |
| Oil Level (g) | 50.0 | 50.0 |
| Oil Phase 2 Conditions | | |
| Oil | Cedarwood Oil | Cedarwood Oil |
| Oil Level (g) | 200.0 | 200.0 |
| Free Radical Initiator #1 | Vazo-52 | Vazo-52 |
| Free Radical Initiator #1 Level (g) | 2.0 | 2.0 |
| Free Radical Initiator #2 | Vazo-67 | Vazo-67 |
| Free Radical Initiator #2 Level (g) | 1.0 | 1.0 |
| Water Phase Conditions | | |
| Emulsifier | Colloid 351 | Colloid 351 |
| Emulsifier Solids (%) | 25.0 | 25.0 |
| Emulsifier Level (g) | 25.0 | 25.0 |
| 20% NaOH Level (g) | 5.0 | 5.0 |
| Water Level (g) | 500.0 | 500.0 |
| Water Phase Initiator | Vazo-68WSP | Vazo-68WSP |
| Water Phase Initiator Level (g) | 2.0 | 2.0 |
| Water Phase pH | 5.36 | 5.36 |

|  | | |
|---|---|---|
| Pre-Reaction Conditions | | |
| Vazo Pre-Reaction Time (minutes) | 120 | 120 |
| Vazo Pre-Reaction Temperature (° C.) | 60 | 60 |
| Wall Pre-Reaction Time (minutes) | 15 | 15 |
| Wall Pre-Reaction Temperature (° C.) | 60 | 60 |
| Milling Conditions | | |
| Milling Temperature (° C.) | 60 | 60 |
| Milling Time (minutes) | 30 | 30 |
| Milling rpm | 2500 | 2500 |
| End-of-mill Size (microns) | 14.05 | 16.38 |
| Reaction Conditions | | |
| Hold Time #1 (hours) | 5.25 | 5.25 |
| Hold Temperature #1 (° C.) | 60 | 60 |
| Hold Time #2 (hours) | 8 | 8 |
| Hold Temperature #2 (° C.) | 90 | 90 |
| Hold Time #3 (hours) | n/a | n/a |
| Hold Temperature #3 (° C.) | n/a | n/a |
| Mean Size (um) | 17.67 | 18.85 |

| Identifiers | Example 19 TAS0508071 | Example 20 TAS0509071 | Example 21 TAS0510071 | Example 22 TAS0510072 | Example 23 TAS0514072 |
|---|---|---|---|---|---|
| Oil Phase 1 Conditions | | | | | |
| Amine Monomer | TBAEMA | CN371 | TBAEMA | TBAEMA | TBAEMA |
| Amine Monomer Level (g) | 0.9 | 3.0 | 0.9 | 0.9 | 0.9 |
| Wall Monomer #1 | SR444 | SR444 | SR444 | CN997 (aromatic urethane acrylate oligomer) | SR295 |
| Wall Monomer #1 Level (g) | 24.1 | 22.0 | 24.1 | 24.1 | 24.1 |
| Wall Monomer #2 | n/a | n/a | n/a | n/a | n/a |
| Wall Monomer #2 Level (g) | n/a | n/a | n/a | n/a | n/a |
| Acid | MBM | MBM | MBM | MBM | MBM |
| Acid Level (g) | 2.5 | 2.5 | 2.5 | 2.5 | 2.5 |
| Oil | Ethyl Heptanoate | Cedarwood Oil | Ethyl Benzoate | Cedarwood Oil | Cedarwood Oil |
| Oil Level (g) | 50.0 | 50.0 | 50.0 | 50.0 | 50.0 |
| Oil Phase 2 Conditions | | | | | |
| Oil | Ethyl Heptanoate | Cedarwood Oil | Ethyl Benzoate | Cedarwood Oil | Cedarwood Oil |
| Oil Level (g) | 200.0 | 200.0 | 200.0 | 200.0 | 200.0 |
| Free Radical Initiator #1 | Vazo-52 | Vazo-52 | Vazo-52 | Vazo-52 | Vazo-52 |
| Free Radical Initiator #1 Level (g) | 2.0 | 2.0 | 2.0 | 2.0 | 2.0 |
| Free Radical Initiator #2 | Vazo-67 | Vazo-67 | Vazo-67 | Vazo-67 | Vazo-67 |
| Free Radical Initiator #2 Level (g) | 1.0 | 1.0 | 1.0 | 1.0 | 1.0 |
| Water Phase Conditions | | | | | |
| Emulsifier | Colloid 351 | Colloid 351 | Colloid 351 | Colloid 351 | Colloid 351 |
| Emulsifier Solids (%) | 25.0 | 25.0 | 25.0 | 25.0 | 25.0 |
| Emulsifier Level (g) | 25.0 | 25.0 | 25.0 | 25.0 | 25.0 |
| 20% NaOH Level (g) | 5.0 | 5.0 | 5.0 | 5.0 | 5.0 |
| Water Level (g) | 500.0 | 500.0 | 500.0 | 500.0 | 500.0 |
| Water Phase Initiator | Vazo-68WSP | Vazo-68WSP | Vazo-68WSP | Vazo-68WSP | Vazo-68WSP |
| Water Phase Initiator Level (g) | 2.0 | 2.0 | 2.0 | 2.0 | 2.0 |
| Water Phase pH | 5.33 | 5.33 | 5.34 | 5.32 | 5.36 |
| Pre-Reaction Conditions | | | | | |
| Vazo Pre-Reaction Time (minutes) | 120 | 120 | 120 | 120 | 120 |
| Vazo Pre-Reaction Temperature (° C.) | 60 | 60 | 60 | 60 | 60 |
| Wall Pre-Reaction Time (minutes) | 15 | 15 | 15 | 15 | 15 |
| Wall Pre-Reaction Temperature (° C.) | 60 | 60 | 60 | 60 | 60 |
| Milling Conditions | | | | | |
| Milling Temperature (° C.) | 60 | 60 | 60 | 60 | 60 |
| Milling Time (minutes) | 30 | 30 | 30 | 30 | 30 |
| Milling rpm | 2500 | 2500 | 2500 | 2500 | 2500 |
| End-of-mill Size (microns) | 20.07 | 8.68 | 13.95 | 19.59 | 14.85 |
| Reaction Conditions | | | | | |
| Hold Time #1 (hours) | 5.25 | 5.25 | 5.25 | 5.25 | 5.25 |
| Hold Temperature #1 (° C.) | 60 | 60 | 60 | 60 | 60 |
| Hold Time #2 (hours) | 8 | 8 | 8 | 8 | 8 |
| Hold Temperature #2 (° C.) | 90 | 90 | 90 | 90 | 90 |
| Hold Time #3 (hours) | n/a | n/a | n/a | n/a | n/a |
| Hold Temperature #3 (° C.) | n/a | n/a | n/a | n/a | n/a |
| Mean Size (um) | 18.92 | 9.88 | 17.23 | 21.83 | 16.73 |

-continued

| Identifiers | Example 24<br>TAS01505071 | Example 25<br>TAS0515072 | Example 26<br>TAS0516071 | Example 27<br>TAS0529072 | Example 28<br>TAS0530072 |
|---|---|---|---|---|---|
| Oil Phase 1 Conditions | | | | | |
| Amine Monomer | TBAEMA | TBAEMA | TBAEMA | TBAEMA | TBAEMA |
| Amine Monomer Level (g) | 0.9 | 0.9 | 0.9 | 0.9 | 0.9 |
| Wall Monomer #1 | SR444 | SR206 | SR444 | SR295 | SR206 |
| Wall Monomer #1 Level (g) | 24.1 | 24.1 | 24.1 | 24.1 | 24.1 |
| Wall Monomer #2 | n/a | n/a | n/a | n/a | n/a |
| Wall Monomer #2 Level (g) | n/a | n/a | n/a | n/a | n/a |
| Acid | MBM | MBM | MBM | MBM | MBM |
| Acid Level (g) | 2.5 | 2.5 | 2.5 | 2.5 | 2.5 |
| Oil | Octyl Octanoate | Cedarwood Oil | 2-Nonanone | Peppermint Oil | Peppermint Oil |
| Oil Level (g) | 50.0 | 50.0 | 50.0 | 50.0 | 50.0 |
| Oil Phase 2 Conditions | | | | | |
| Oil | Octyl Octanoate | Cedarwood Oil | 2-Nonanone | Peppermint Oil | Peppermint Oil |
| Oil Level (g) | 200.0 | 200.0 | 200.0 | 200.0 | 200.0 |
| Free Radical Initiator #1 | Vazo-52 | Vazo-52 | Vazo-52 | Vazo-52 | Vazo-52 |
| Free Radical Initiator #1 Level (g) | 2.0 | 2.0 | 2.0 | 2.0 | 2.0 |
| Free Radical Initiator #2 | Vazo-67 | Vazo-67 | Vazo-67 | Vazo-67 | Vazo-67 |
| Free Radical Initiator #2 Level (g) | 1.0 | 1.0 | 1.0 | 1.0 | 1.0 |
| Water Phase Conditions | | | | | |
| Emulsifier | Colloid 351 | Colloid 351 | Colloid 351 | Colloid 351 | Colloid 351 |
| Emulsifier Solids (%) | 25.0 | 25.0 | 25.0 | 25.0 | 25.0 |
| Emulsifier Level (g) | 25.0 | 25.0 | 25.0 | 25.0 | 25.0 |
| 20% NaOH Level (g) | 5.0 | 5.0 | 5.0 | 5.0 | 5.0 |
| Water Level (g) | 500.0 | 500.0 | 500.0 | 500.0 | 500.0 |
| Water Phase Initiator | Vazo-68WSP | Vazo-68WSP | Vazo-68WSP | Vazo-68WSP | Vazo-68WSP |
| Water Phase Initiator Level (g) | 2.0 | 2.0 | 2.0 | 2.0 | 2.0 |
| Water Phase pH | 5.32 | 5.35 | 5.33 | 5.37 | 5.39 |
| Pre-Reaction Conditions | | | | | |
| Vazo Pre-Reaction Time (minutes) | 120 | 120 | 120 | 120 | 120 |
| Vazo Pre-Reaction Temperature (° C.) | 60 | 60 | 60 | 55 | 55 |
| Wall Pre-Reaction Time (minutes) | 15 | 15 | 15 | 15 | 15 |
| Wall Pre-Reaction Temperature (° C.) | 60 | 60 | 60 | 55 | 55 |

| Identifiers | TAS01505071 | TAS0515072 | TAS0510071 | TAS0529072 | TAS0530072 |
|---|---|---|---|---|---|
| Milling Conditions | | | | | |
| Milling Temperature (° C.) | 60 | 60 | 60 | 55 | 55 |
| Milling Time (minutes) | 30 | 30 | 30 | 30 | 30 |
| Milling rpm | 2500 | 2500 | 2500 | 2500 | 2500 |
| End-of-mill Size (microns) | 38.07 | 16.05 | 11.99 | 14.04 | 12.35 |
| Reaction Conditions | | | | | |
| Hold Time #1 (hours) | 5.25 | 5.25 | 5.25 | 5.25 | 5.25 |
| Hold Temperature #1 (° C.) | 60 | 60 | 60 | 55 | 55 |
| Hold Time #2 (hours) | 8 | 8 | 8 | 8 | 8 |
| Hold Temperature #2 (° C.) | 90 | 90 | 90 | 90 | 90 |
| Hold Time #3 (hours) | n/a | n/a | n/a | n/a | n/a |
| Hold Temperature #3 (° C.) | n/a | n/a | n/a | n/a | n/a |
| Mean Size (um) | 38.66 | 19.77 | 17.07 | 15.69 | 18.74 |

| Identifiers | Example 29<br>TAS0531071 | Example 30<br>TAS0531072 | Example 31<br>TAS0601071 | Example 32<br>TAS0601072 | Example 33<br>TAS0604071 |
|---|---|---|---|---|---|
| Oil Phase 1 Conditions | | | | | |
| Amine Monomer | TBAEMA | TBAEMA | TBAEMA | CN371 | CN551 |
| Amine Monomer Level (g) | 0.9 | 0.9 | 0.9 | 3.0 | 7.5 |
| Wall Monomer #1 | SR444 | SR355 | SR248 | SR295 | SR295 |
| Wall Monomer #1 Level (g) | 24.1 | 24.1 | 24.1 | 22.0 | 17.5 |
| Wall Monomer #2 | n/a | n/a | n/a | n/a | n/a |
| Wall Monomer #2 Level (g) | n/a | n/a | n/a | n/a | n/a |
| Acid | MBM | MBM | MBM | MBM | MBM |
| Acid Level (g) | 2.5 | 2.5 | 2.5 | 2.5 | 2.5 |
| Oil | Peppermint Oil | Peppermint Oil | Peppermint Oil | Peppermint Oil | Peppermint Oil |
| Oil Level (g) | 50.0 | 50.0 | 50.0 | 50.0 | 50.0 |
| Oil Phase 2 Conditions | | | | | |
| Oil | Peppermint Oil | Peppermint Oil | Peppermint Oil | Peppermint Oil | Peppermint Oil |
| Oil Level (g) | 200.0 | 200.0 | 200.0 | 200.0 | 200.0 |
| Free Radical Initiator #1 | Vazo-52 | Vazo-52 | Vazo-52 | Vazo-52 | Vazo-52 |
| Free Radical Initiator #1 Level (g) | 2.0 | 2.0 | 2.0 | 2.0 | 2.0 |

-continued

| | | | | | |
|---|---|---|---|---|---|
| Free Radical Initiator #2 | Vazo-67 | Vazo-67 | Vazo-67 | Vazo-67 | Vazo-67 |
| Free Radical Initiator #2 Level (g) | 1.0 | 1.0 | 1.0 | 1.0 | 1.0 |
| Water Phase Conditions | | | | | |
| Emulsifier | Colloid 351 | Colloid 351 | Colloid 351 | Colloid 351 | Colloid 351 |
| Emulsifier Solids (%) | 25.0 | 25.0 | 25.0 | 25.0 | 25.0 |
| Emulsifier Level (g) | 25.0 | 25.0 | 25.0 | 25.0 | 25.0 |
| 20% NaOH Level (g) | 5.0 | 5.0 | 5.0 | 5.0 | 5.0 |
| Water Level (g) | 500.0 | 500.0 | 500.0 | 500.0 | 500.0 |
| Water Phase Initiator | Vazo-68WSP | Vazo-68WSP | Vazo-68WSP | Vazo-68WSP | Vazo-68WSP |
| Water Phase Initiator Level (g) | 2.0 | 2.0 | 2.0 | 2.0 | 2.0 |
| Water Phase pH | 5.39 | 5.39 | 5.38 | 5.36 | 5.37 |
| Pre-Reaction Conditions | | | | | |
| Vazo Pre-Reaction Time (minutes) | 120 | 120 | 120 | 120 | 120 |
| Vazo Pre-Reaction Temperature (° C.) | 55 | 55 | 55 | 55 | 55 |
| Wall Pre-Reaction Time (minutes) | 15 | 15 | 15 | 15 | 15 |
| Wall Pre-Reaction Temperature (° C.) | 55 | 55 | 55 | 55 | 55 |
| Milling Conditions | | | | | |
| Milling Temperature (° C.) | 55 | 55 | 55 | 55 | 55 |
| Milling Time (minutes) | 30 | 30 | 30 | 30 | 30 |
| Milling rpm | 2500 | 2500 | 2500 | 2500 | 2500 |
| End-of-mill Size (microns) | 12.60 | 8.13 | 7.67 | 14.86 | 9.93 |
| Reaction Conditions | | | | | |
| Hold Time #1 (hours) | 5.25 | 5.25 | 5.25 | 5.25 | 5.25 |
| Hold Temperature #1 (° C.) | 55 | 55 | 55 | 55 | 55 |
| Hold Time #2 (hours) | 8 | 8 | 8 | 8 | 8 |
| Hold Temperature #2 (° C.) | 90 | 90 | 90 | 90 | 90 |
| Hold Time #3 (hours) | n/a | n/a | n/a | n/a | n/a |
| Hold Temperature #3 (° C.) | n/a | n/a | n/a | n/a | n/a |
| Mean Size (um) | 15.64 | 8.54 | 7.34 | 17.26 | 12.21 |

| Identifiers | Example 34 TAS0614071 | Example 35 TAS0619071 | Example 36 TAS0620071 | Example 37 TAS0621071 | Example 38 TAS0621072 |
|---|---|---|---|---|---|
| Oil Phase 1 Conditions | | | | | |
| Amine Monomer | TBAEMA | TBAEMA | TBAEMA | TBAEMA | TBAEMA |
| Amine Monomer Level (g) | 0.9 | 0.5 | 0.25 | 0.5 | 0.5 |
| Wall Monomer #1 | SR444 | SR444 | SR444 | SR444 | SR444 |
| Wall Monomer #1 Level (g) | 24.1 | 24.1 | 24.75 | 24.5 | 24.5 |
| Wall Monomer #2 | n/a | n/a | n/a | n/a | n/a |
| Wall Monomer #2 Level (g) | n/a | n/a | n/a | n/a | n/a |
| Acid | MBM | MBM | MBM | MBM | MBM |
| Acid Level (g) | 2.5 | 1.0 | 0.5 | 1.0 | 1.0 |
| Oil | 2% 16B in ME 130 | 2% 16B in ME 130 | 2% 16B in ME 130 | 2% 16B in ME 130 | 2% 16B in ME 130 |
| Oil Level (g) | 50.0 | 50.0 | 50.0 | 50.0 | 50.0 |
| Oil Phase 2 Conditions | | | | | |
| Oil | 2% 16B in ME 130 | 2% 16B in ME 130 | 2% 16B in ME 130 | 2% 16B in ME 130 | 2% 16B in ME 130 |
| Oil Level (g) | 200.0 | 200.0 | 200.0 | 200.0 | 200.0 |
| Free Radical Initiator #1 | Vazo-52 | Vazo-52 | Vazo-52 | Vazo-52 | Vazo-52 |
| Free Radical Initiator #1 Level (g) | 2.0 | 2.0 | 2.0 | 2.0 | 2.0 |
| Free Radical Initiator #2 | Vazo-67 | Vazo-67 | Vazo-67 | Vazo-67 | Vazo-67 |
| Free Radical Initiator #2 Level (g) | 1.0 | 1.0 | 1.0 | 1.0 | 1.0 |
| Water Phase Conditions | | | | | |
| Emulsifier | Colloid 351 | Colloid 351 | Colloid 351 | Colloid 351 | Colloid 351 |
| Emulsifier Solids (%) | 25.0 | 25.0 | 25.0 | 25.0 | 25.0 |
| Emulsifier Level (g) | 25.0 | 25.0 | 25.0 | 25.0 | 25.0 |
| 20% NaOH Level (g) | 5.0 | 5.0 | 5.0 | 5.0 | 5.0 |
| Water Level (g) | 500.0 | 500.0 | 500.0 | 500.0 | 500.0 |
| Water Phase Initiator | Vazo-68WSP | Vazo-68WSP | Vazo-68WSP | Vazo-68WSP | Vazo-68WSP |
| Water Phase Initiator Level (g) | 2.0 | 2.0 | 2.0 | 2.0 | 2.0 |
| Water Phase pH | 5.36 | 5.42 | 5.38 | 5.40 | 5.10 |
| Pre-Reaction Conditions | | | | | |
| Vazo Pre-Reaction Time (minutes) | 120 | 120 | 120 | 180 | 120 |
| Vazo Pre-Reaction Temperature (° C.) | 55 | 55 | 55 | 55 | 55 |
| Wall Pre-Reaction Time (minutes) | 15 | 15 | 15 | 15 | 15 |
| Wall Pre-Reaction Temperature (° C.) | 55 | 55 | 55 | 55 | 55 |
| Milling Conditions | | | | | |
| Milling Temperature (° C.) | 55 | 55 | 55 | 55 | 55 |
| Milling Time (minutes) | 30 | 30 | 30 | 30 | 30 |

-continued

| | | | | | |
|---|---|---|---|---|---|
| Milling rpm | 2500 | 2500 | 2500 | 2500 | 2500 |
| End-of-mill Size (microns) | 15.54 | 18.98 | 20.36 | 18.58 | 17.33 |
| Reaction Conditions | | | | | |
| Hold Time #1 (hours) | 5.25 | 5.25 | 5.25 | 0.25 | 1.25 |
| Hold Temperature #1 (° C.) | 55 | 55 | 55 | 55 | 55 |
| Hold Time #2 (hours) | 8 | 8 | 8 | 4 | 4 |
| Hold Temperature #2 (° C.) | 90 | 90 | 90 | 70 | 70 |
| Hold Time #3 (hours) | n/a | n/a | n/a | 8.0 | 8.0 |
| Hold Temperature #3 (° C.) | n/a | n/a | n/a | 90.0 | 90.0 |
| Mean Size (um) | 17.40 | 24.09 | 24.1 | 21.71 | 21.95 |

| Identifiers | Example 39 TAS0625071 | Example 40 TAS0626071 | Example 41 TAS0626072 | Example 42 TAS0627071 | Example 43 TAS0702071 |
|---|---|---|---|---|---|
| Oil Phase 1 Conditions | | | | | |
| Amine Monomer | TBAEMA | TBAEMA | TBAEMA | TBAEMA | TBAEMA |
| Amine Monomer Level (g) | 0.5 | 0.5 | 0.5 | 0.5 | 0.5 |
| Wall Monomer #1 | SR444 | SR444 | SR444 | SR444 | SR444 |
| Wall Monomer #1 Level (g) | 24.5 | 24.5 | 24.5 | 24.5 | 24.5 |
| Wall Monomer #2 | n/a | n/a | n/a | n/a | n/a |
| Wall Monomer #2 Level (g) | n/a | n/a | n/a | n/a | n/a |
| Acid | MBM | MBM | MBM | MBM | MBM |
| Acid Level (g) | 1.0 | 1.0 | 0.5 | 1.0 | 1.0 |
| Oil | 2% 16B in ME 130 | 2% 16B in ME 130 | 2% 16B in ME 130 | 2% 16B in ME 130 | 2% 16B in ME 130 |
| Oil Level (g) | 50.0 | 50.0 | 50.0 | 50.0 | 50.0 |
| Oil Phase 2 Conditions | | | | | |
| Oil | 2% 16B in ME 130 | 2% 16B in ME 130 | 2% 16B in ME 130 | 2% 16B in ME 130 | 2% 16B in ME 130 |
| Oil Level (g) | 200.0 | 200.0 | 200.0 | 200.0 | 200.0 |
| Free Radical Initiator #1 | Vazo-52 | Vazo-52 | Vazo-52 | Vazo-52 | Vazo-52 |
| Free Radical Initiator #1 Level (g) | 2.0 | 2.0 | 2.0 | 2.0 | 2.0 |
| Free Radical Initiator #2 | Vazo-67 | Vazo-67 | Vazo-67 | Vazo-67 | Vazo-67 |
| Free Radical Initiator #2 Level (g) | 1.0 | 1.0 | 1.0 | 1.0 | 1.0 |
| Water Phase Conditions | | | | | |
| Emulsifier | Colloid 351 | Colloid 351 | Colloid 351 | Colloid 351 | Colloid 351 |
| Emulsifier Solids (%) | 25.0 | 25.0 | 25.0 | 25.0 | 25.0 |
| Emulsifier Level (g) | 25.0 | 25.0 | 25.0 | 25.0 | 25.0 |
| 20% NaOH Level (g) | 5.0 | 5.0 | 5.0 | 5.0 | 5.0 |
| Water Level (g) | 500.0 | 500.0 | 500.0 | 500.0 | 500.0 |
| Water Phase Initiator | Vazo-68WSP | Vazo-68WSP | Vazo-68WSP | Vazo-68WSP | Vazo-68WSP |
| Water Phase Initiator Level (g) | 2.0 | 2.0 | 2.0 | 2.0 | 2.0 |
| Water Phase pH | 5.35 | 5.41 | 5.40 | 5.38 | 5.39 |
| Pre-Reaction Conditions | | | | | |
| Vazo Pre-Reaction Time (minutes) | 60 | 120 | 120 | 60 | 60 |
| Vazo Pre-Reaction Temperature (° C.) | 75 | 75 | 55 | 75 | 75 |
| Wall Pre-Reaction Time (minutes) | 15 | 15 | 15 | 30 | 30 |
| Wall Pre-Reaction Temperature (° C.) | 55 | 75 | 55 | 55 | 55 |
| Milling Conditions | | | | | |
| Milling Temperature (° C.) | 55 | 75 | 55 | 55 | 55 |
| Milling Time (minutes) | 30 | 30 | 30 | 30 | 30 |
| Milling rpm | 2500 | 2500 | 2500 | 2500 | 2500 |
| End-of-mill Size (microns) | 15.69 | 35.10 | 18.00 | 17.24 | 13.46 |
| Reaction Conditions | | | | | |
| Hold Time #1 (hours) | 0.25 | 5.25 | 1.25 | 4 | 1 |
| Hold Temperature #1 (° C.) | 55 | 70 | 55 | 70 | 55 |
| Hold Time #2 (hours) | 4 | 8 | 4 | 8 | 4 |
| Hold Temperature #2 (° C.) | 70 | 90 | 70 | 90 | 70 |
| Hold Time #3 (hours) | 8.0 | n/a | 8.0 | n/a | 8 |
| Hold Temperature #3 (° C.) | 90.0 | n/a | 90.0 | n/a | 90 |
| Mean Size (um) | 15.32 | 33.83 | 20.74 | 20.62 | 21.37 |

| Identifiers | Example 44 TAS0702072 | Example 45 TAS0703701 | Example 46 TAS0709701 | Example 47 TAS0710071 | Example 48 TAS0710072 |
|---|---|---|---|---|---|
| Oil Phase 1 Conditions | | | | | |
| Amine Monomer | TBAEMA | TBAEMA | TBAEMA | TBAEMA | TBAEMA |
| Amine Monomer Level (g) | 0.5 | 0.5 | 0.5 | 0.5 | 0.5 |
| Wall Monomer #1 | SR444 | SR444 | SR444 | SR444 | SR444 |
| Wall Monomer #1 Level (g) | 24.5 | 24.5 | 24.5 | 24.5 | 24.5 |
| Wall Monomer #2 | n/a | n/a | n/a | n/a | n/a |

-continued

| | | | | | |
|---|---|---|---|---|---|
| Wall Monomer #2 Level (g) | n/a | n/a | n/a | n/a | n/a |
| Acid | MBM | MBM | MBM | MBM | MBM |
| Acid Level (g) | 1.0 | 1.0 | 1.0 | 1.0 | 1.0 |
| Oil | 2% 16B in ME 130 | 2% 16B in ME 130 | 2% 16B in ME 130 | 2% 16B in ME 130 | 2% 16B in ME 130 |
| Oil Level (g) | 50.0 | 50.0 | 50.0 | 50.0 | 50.0 |
| Oil Phase 2 Conditions | | | | | |
| Oil | 2% 16B in ME 130 | 2% 16B in ME 130 | 2% 16B in ME 130 | 2% 16B in ME 130 | 2% 16B in ME 130 |
| Oil Level (g) | 200.0 | 200.0 | 200.0 | 200.0 | 200.0 |
| Free Radical Initiator #1 | Vazo-52 | Vazo-52 | Vazo-52 | Vazo-52 | Vazo-52 |
| Free Radical Initiator #1 Level (g) | 2.0 | 2.0 | 2.0 | 2.0 | 2.0 |
| Free Radical Initiator #2 | Vazo-67 | Vazo-67 | Vazo-67 | Vazo-67 | Vazo-67 |
| Free Radical Initiator #2 Level (g) | 1.0 | 1.0 | 1.0 | 1.0 | 1.0 |
| Water Phase Conditions | | | | | |
| Emulsifier | Colloid 351 | Colloid 351 | Colloid 351 | Colloid 351 | Colloid 351 |
| Emulsifier Solids (%) | 25.0 | 25.0 | 25.0 | 25.0 | 25.0 |
| Emulsifier Level (g) | 25.0 | 25.0 | 25.0 | 25.0 | 25.0 |
| 20% NaOH Level (g) | 5.0 | 5.0 | 5.0 | 5.0 | 5.0 |
| Water Level (g) | 500.0 | 500.0 | 500.0 | 500.0 | 500.0 |
| Water Phase Initiator | Vazo-68WSP | Vazo-68WSP | Vazo-68WSP | Vazo-68WSP | Vazo-68WSP |
| Water Phase Initiator Level (g) | 2.0 | 2.0 | 2.0 | 2.0 | 2.0 |
| Water Phase pH | 5.38 | 5.39 | 5.35 | 5.39 | 5.37 |
| Pre-Reaction Conditions | | | | | |
| Vazo Pre-Reaction Time (minutes) | 120 | 60 | 30 | 15 | 30 |
| Vazo Pre-Reaction Temperature (° C.) | 75 | 75 | 75 | 75 | 75 |
| Wall Pre-Reaction Time (minutes) | 60 | 60 | 30 | 30 | 60 |
| Wall Pre-Reaction Temperature (° C.) | 55 | 55 | 55 | 55 | 55 |
| Milling Conditions | | | | | |
| Milling Temperature (° C.) | 55 | 55 | 55 | 55 | 55 |
| Milling Time (minutes) | 30 | 30 | 60 | 60 | 60 |
| Milling rpm | 2500 | 2500 | 2500 | 2500 | 2500 |
| End-of-mill Size (microns) | 12.01 | 15.54 | 17.17 | 16.19 | 13.10 |
| Reaction Conditions | | | | | |
| Hold Time #1 (hours) | 0.5 | 2.5 | 2.5 | 2.5 | 2.0 |
| Hold Temperature #1 (° C.) | 55 | 55 | 55 | 55 | 55 |
| Hold Time #2 (hours) | 4 | 4 | 4 | 4 | 4 |
| Hold Temperature #2 (° C.) | 70 | 70 | 70 | 70 | 70 |
| Hold Time #3 (hours) | 8 | 8 | 8 | 8 | 8 |
| Hold Temperature #3 (° C.) | 90.0 | 90 | 90 | 90 | 90 |
| Mean Size (um) | 15.62 | 19.56 | 22.52 | 22.96 | 19.36 |

| Identifiers | Example 49 TAS0731071 | Example 50 TAS0731072 | Example 51 TAS0731072 |
|---|---|---|---|
| Oil Phase 1 Conditions | | | |
| Amine Monomer | TBAEMA | TBAEMA | TBAEMA |
| Amine Monomer Level (g) | 0.5 | 0.5 | 0.5 |
| Wall Monomer #1 | SR444 | SR355 | SR206 |
| Wall Monomer #1 Level (g) | 24.5 | 24.5 | 24.5 |
| Wall Monomer #2 | n/a | n/a | n/a |
| Wall Monomer #2 Level (g) | n/a | n/a | n/a |
| Acid | MBM | MBM | MBM |
| Acid Level (g) | 1.0 | 1.0 | 1.0 |
| Oil | 2% 16B in ME 130 | 2% 16B in ME 130 | 2% 16B in ME 130 |
| Oil Level (g) | 50.0 | 50.0 | 50.0 |
| Oil Phase 2 Conditions | | | |
| Oil | 2% 16B in ME 130 | 2% 16B in ME 130 | 2% 16B in ME 130 |
| Oil Level (g) | 200.0 | 200.0 | 200.0 |
| Free Radical Initiator #1 | Vazo-52 | Vazo-52 | Vazo-52 |
| Free Radical Initiator #1 Level (g) | 2.0 | 2.0 | 2.0 |
| Free Radical Initiator #2 | Vazo-67 | Vazo-67 | Vazo-67 |
| Free Radical Initiator #2 Level (g) | 1.0 | 1.0 | 1.0 |
| Water Phase Conditions | | | |
| Emulsifier | Colloid 351 | Colloid 351 | Colloid 351 |
| Emulsifier Solids (%) | 25.0 | 25.0 | 25.0 |
| Emulsifier Level (g) | 25.0 | 25.0 | 25.0 |
| 20% NaOH Level (g) | 5.0 | 5.0 | 5.0 |
| Water Level (g) | 500.0 | 500.0 | 500.0 |
| Water Phase Initiator | Vazo-68WSP | Vazo-68WSP | Vazo-68WSP |
| Water Phase Initiator Level (g) | 2.0 | 2.0 | 2.0 |
| Water Phase pH | 5.37 | 5.34 | 5.34 |

-continued

| Pre-Reaction Conditions | | | |
|---|---|---|---|
| Vazo Pre-Reaction Time (minutes) | 30 | 30 | 30 |
| Vazo Pre-Reaction Temperature (° C.) | 75 | 75 | 75 |
| Wall Pre-Reaction Time (minutes) | 30 | 30 | 30 |
| Wall Pre-Reaction Temperature (° C.) | 55 | 55 | 55 |
| Milling Conditions | | | |
| Milling Temperature (° C.) | 55 | 55 | 55 |
| Milling Time (minutes) | 60 | 60 | 60 |
| Milling rpm | 2500 | 2500 | 2500 |
| End-of-mill Size (microns) | 14.01 | 13.41 | 14.21 |
| Reaction Conditions | | | |
| Hold Time #1 (hours) | 2.5 | 2.5 | 2.5 |
| Hold Temperature #1 (° C.) | 55 | 55 | 55 |
| Hold Time #2 (hours) | 4 | 4 | 4 |
| Hold Temperature #2 (° C.) | 70 | 70 | 70 |
| Hold Time #3 (hours) | 8 | 8 | 8 |
| Hold Temperature #3 (° C.) | 90.0 | 90 | 90 |
| Mean Size (um) | 20.94 | 17.00 | 18.68 |

| Identifiers | Example 52 TAS1001072 | Example 53 TAS1002071 | Example 54 TAS1004072 | Example 55 TAS1008071 | Example 56 TAS1009072 |
|---|---|---|---|---|---|
| Oil Phase 1 Conditions | | | | | |
| Amine Monomer | TBAEMA | TBAEMA | TBAEMA | TBAEMA | TBAEMA |
| Amine Monomer Level (g) | 0.75 | 0.50 | 0.75 | 0.75 | 0.75 |
| Wall Monomer #1 | SR355 | SR355 | SR355 | SR355 | SR295 |
| Wall Monomer #1 Level (g) | 24.25 | 24.50 | 24.25 | 24.25 | 24.25 |
| Wall Monomer #2 | n/a | n/a | n/a | n/a | n/a |
| Wall Monomer #2 Level (g) | n/a | n/a | n/a | n/a | n/a |
| Acid | MBM | MBM | MBM | MBM | MBM |
| Acid Level (g) | 1.0 | 1.0 | 1.0 | 1.0 | 1.0 |
| Oil | Black-15/ODB-2/CVL/I6B/ME-130 | Black-15/ODB-2/CVL/I6B/ME-130 | Black-15/ODB-2/CVL/I6B/ME-130 | Black-15/ODB-2/CVL/I6B/ME-130 | Black-15/ODB-2/CVL/I6B/ME-130 |
| Oil Level (g) | 117.3 | 117.3 | 117.3 | 117.3 | 117.3 |
| Oil Phase 2 Conditions | | | | | |
| Oil | Norpar-12 | Norpar-12 | Norpar-12 | Norpar-12 | Norpar-12 |
| Oil Level (g) | 132.7 | 132.7 | 132.7 | 132.7 | 132.7 |
| Free Radical Initiator #1 | Vazo-52 | Vazo-52 | Vazo-52 | Vazo-52 | Vazo-52 |
| Free Radical Initiator #1 Level (g) | 2.0 | 2.0 | 2.0 | 2.0 | 2.0 |
| Free Radical Initiator #2 | Vazo-67 | Vazo-67 | Vazo-67 | Vazo-67 | Vazo-67 |
| Free Radical Initiator #2 Level (g) | 1.0 | 1.0 | 1.0 | 1.0 | 1.0 |
| Water Phase Conditions | | | | | |
| Emulsifier | Colloid 351 | Colloid 351 | Colloid 351 | Colloid 351 | Colloid 351 |
| Emulsifier Solids (%) | 25.0 | 25.0 | 25.0 | 25.0 | 25.0 |
| Emulsifier Level (g) | 25.0 | 25.0 | 25.0 | 25.0 | 25.0 |
| 20% NaOH Level (g) | 3.0 | 3.0 | 3.0 | 3.0 | 3.0 |
| Water Level (g) | 500.0 | 500.0 | 500.0 | 350.0 | 500.0 |
| Water Phase Initiator | Vazo-68WSP | Vazo-68WSP | Vazo-68WSP | Vazo-68WSP | Vazo-68WSP |
| Water Phase Initiator Level (g) | 2.0 | 2.0 | 2.0 | 2.0 | 2.0 |
| Water Phase pH | 4.83 | 4.83 | 4.88 | 4.76 | 4.81 |
| Pre-Reaction Conditions | | | | | |
| Vazo Pre-Reaction Time (minutes) | 60 | 60 | 60 | 60 | 60 |
| Vazo Pre-Reaction Temperature (° C.) | 60 | 60 | 60 | 60 | 55 |
| Wall Pre-Reaction Time (minutes) | 60 | 60 | 60 | 60 | 15 |
| Wall Pre-Reaction Temperature (° C.) | 60 | 60 | 60 | 60 | 55 |
| Milling Conditions | | | | | |
| Milling Temperature 1 (° C.) | 60 | 60 | 60 | 60 | 55 |
| Milling Time (minutes) | 60 | 60 | 60 | 60 | 60 |
| Ramp Time to Temperature 2 (minutes) | 30 | 30 | 30 | 30 | 30 |
| Milling Temperature 2 (° C.) | 75 | 75 | 75 | 75 | 75 |
| Milling Time 2 (minutes) | 30 | 30 | 30 | 30 | 30 |
| Total Milling Time (minutes) | 120 | 120 | 120 | 120 | 120 |
| Milling rpm | 3500 | 3500 | 3500 | 3500 | 3500 |
| End-of-mill Size (microns) | 5.75 | 5.54 | 5.66 | 6.84 | 6.62 |
| Reaction Conditions | | | | | |
| Hold Time #1 (hours) | 4.00 | 4.00 | 4.00 | 4.00 | 4.00 |
| Hold Temperature #1 (° C.) | 75 | 75 | 75 | 75 | 75 |
| Hold Time #2 (hours) | 8 | 8 | 8 | 8 | 8 |
| Hold Temperature #2 (° C.) | 90 | 90 | 90 | 90 | 90 |

-continued

| | | | | | |
|---|---|---|---|---|---|
| Extracted Core Material (ug/in²) | 0.038 | 0.043 | 0.029 | 0.064 | 0.062 |
| Mean size (um) | 5.79 | 5.56 | 5.83 | 7.18 | 7.19 |

| Identifiers | Example 57 TAS1010072 | Example 58 TAS1011071 | Example 59 TAS1011072 | Example 60 TAS1012071 | Example 61 TAS1016071 |
|---|---|---|---|---|---|
| Oil Phase 1 Conditions | | | | | |
| Amine Monomer | TBAEMA | TBAEMA | TBAEMA | TBAEMA | TBAEMA |
| Amine Monomer Level (g) | 0.75 | 0.75 | 0.75 | 0.75 | 0.75 |
| Wall Monomer #1 | SR355 | SR355 | SR295 | SR295 | SR355 |
| Wall Monomer #1 Level (g) | 24.25 | 18.00 | 24.25 | 12.50 | 24.25 |
| Wall Monomer #2 | n/a | SR295 | n/a | SR355 | n/a |
| Wall Monomer #2 Level (g) | n/a | 6.25 | n/a | 11.75 | n/a |
| Acid | MBM | MBM | MBM | MBM | MBM |
| Acid Level (g) | 1.0 | 1.0 | 1.0 | 1.0 | 1.0 |
| Oil | Black-15/ODB-2/CVL/I6B/ME-130 | Black-15/ODB-2/CVL/I6B/ME-130 | Black-15/ODB-2/CVL/I6B/ME-130 | Black-15/ODB-2/CVL/I6B/ME-130 | Black-15/ODB-2/CVL/I6B/ME-130 |
| Oil Level (g) | 117.3 | 117.3 | 117.3 | 117.3 | 117.3 |
| Oil Phase 2 Conditions | | | | | |
| Oil | Norpar-12 | Norpar-12 | Norpar-12 | Norpar-12 | Norpar-12 |
| Oil Level (g) | 132.7 | 132.7 | 132.7 | 132.7 | 132.7 |
| Free Radical Initiator #1 | Vazo-52 | Vazo-52 | Vazo-52 | Vazo-52 | BPO at 75% solids |
| Free Radical Initiator #1 Level (g) | 2.0 | 2.0 | 2.0 | 2.0 | 2.67 |
| Free Radical Initiator #2 | Vazo-67 | Vazo-67 | Vazo-67 | Vazo-67 | Vazo-67 |
| Free Radical Initiator #2 Level (g) | 1.0 | 1.0 | 1.0 | 1.0 | 1.0 |
| Water Phase Conditions | | | | | |
| Emulsifier | Colloid 121/Colloid 351 | Colloid 351 | Colloid 351 | Colloid 351 | Colloid 351 |
| Emulsifier Solids (%) | 10 g/15 g | 25.0 | 25.0 | 25.0 | 25.0 |
| Emulsifier Level (g) | 25.0 | 25.0 | 25.0 | 25.0 | 25.0 |
| 20% NaOH Level (g) | 3.0 | 3.0 | 3.0 g + 3.0 g after milling | 3.0 | 3.0 |
| Water Level (g) | 500.0 | 500.0 | 500.0 | 500.0 | 500.0 |
| Water Phase Initiator | Vazo-68WSP | Vazo-68WSP | Vazo-68WSP | Vazo-68WSP | Vazo-68WSP |
| Water Phase Initiator Level (g) | 2.0 | 2.0 | 2.0 | 2.0 | 2.0 |
| Water Phase pH | 4.78 | 4.82 | 4.82 (after 3 g 20% naOH) | 4.86 | 4.86 |
| Pre-Reaction Conditions | | | | | |
| Vazo Pre-Reaction Time (minutes) | 60 | 60 | 60 | 60 | 60 |
| Vazo Pre-Reaction Temperature (° C.) | 60 | 60 | 55 | 60 | 60 |
| Wall Pre-Reaction Time (minutes) | 60 | 60 | 15 | 60 | 60 |
| Wall Pre-Reaction Temperature (° C.) | 60 | 60 | 55 | 60 | 60 |
| Milling Conditions | | | | | |
| Milling Temperature 1 (° C.) | 60 | 60 | 55 | 60 | 60 |
| Milling Time (minutes) | 60 | 60 | 60 | 60 | 60 |
| Ramp Time to Temperature 2 (minutes) | 30 | 30 | 30 | 30 | 30 |
| Milling Temperature 2 (° C.) | 75 | 75 | 75 | 75 | 75 |
| Milling Time 2 (minutes) | 30 | 30 | 30 | 30 | 30 |
| Total Milling Time (minutes) | 120 | 120 | 120 | 120 | 120 |
| Milling rpm | 3500 | 3500 | 3500 | 3500 | 3500 |
| End-of-mill Size (microns) | 5.80 | 6.52 | 6.50 | 5.97 | 6.09 |
| Reaction Conditions | | | | | |
| Hold Time #1 (hours) | 4.00 | 4.00 | 4.00 | 4.00 | 4.00 |
| Hold Temperature #1 (° C.) | 75 | 75 | 75 | 75 | 75 |
| Hold Time #2 (hours) | 8 | 8 | 8 | 8 | 8 |
| Hold Temperature #2 (° C.) | 90 | 90 | 90 | 90 | 90 |
| Extracted Core Material (ug/in²) | 0.038 | 0.001 | 0.096 | 0.020 | 0.047 |
| Mean Size (um) | 5.71 | 6.83 | 7.08 | 5.99 | 6.45 |

| Identifiers | Example 62 TAS1017071 |
|---|---|
| Oil Phase 1 Conditions | |
| Amine Monomer | TBAEMA |
| Amine Monomer Level (g) | 0.75 |
| Wall Monomer #1 | SR355 |
| Wall Monomer #1 Level (g) | 24.25 |
| Wall Monomer #2 | n/a |
| Wall Monomer #2 Level (g) | n/a |
| Acid | Beta-C |

| | |
|---|---|
| Acid Level (g) | 2.0 |
| Oil | Black-15/ODB-2/CVL/I6B/ME-130 |
| Oil Level (g) | 118.3 |
| Oil Phase 2 Conditions | |
| Oil | Norpar-12 |
| Oil Level (g) | 132.7 |
| Free Radical Initiator #1 | Vazo-52 |
| Free Radical Initiator #1 Level (g) | 2.0 |
| Free Radical Initiator #2 | Vazo-67 |
| Free Radical Initiator #2 Level (g) | 1.0 |
| Water Phase Conditions | |
| Emulsifier | Colloid 351 |
| Emulsifier Solids (%) | 25.0 |
| Emulsifier Level (g) | 25.0 |
| 20% NaOH Level (g) | 3.0 |
| Water Level (g) | 500.0 |
| Water Phase Initiator | Vazo-68WSP |
| Water Phase Initiator Level (g) | 2.0 |
| Water Phase pH | 4.86 |
| Pre-Reaction Conditions | |
| Vazo Pre-Reaction Time (minutes) | 60 |
| Vazo Pre-Reaction Temperature (° C.) | 60 |
| Wall Pre-Reaction Time (minutes) | 60 |
| Wall Pre-Reaction Temperature (° C.) | 60 |
| Milling Conditions | |
| Milling Temperature 1 (° C.) | 60 |
| Milling Time (minutes) | 60 |
| Ramp Time to Temperature 2 (minutes) | 30 |
| Milling Temperature 2 (° C.) | 75 |
| Milling Time 2 (minutes) | 30 |
| Total Milling Time (minutes) | 120 |
| Milling rpm | 3500 |
| End-of-mill Size (microns) | 6.00 |
| Reaction Conditions | |
| Hold Time #1 (hours) | 4.00 |
| Hold Temperature #1 (° C.) | 75 |
| Hold Time #2 (hours) | 8 |
| Hold Temperature #2 (° C.) | 90 |
| Extracted Material (ug/in$^2$) | 0.054 |
| Mean Size (um) | 6.02 |

Description of Examples:
1) Example 2 and Comparative Example 3 are identified as TAS0409071 respectively, and TAS0410071 show a comparison of capsules prepared using a core material of Oleocal ME-130 and SR248 wall material. The solubility of the CN371 amine resin (at an optimized level of 12% of the wall) was poor and the batch exhibited coalescence. Both poor resin solubility in a standard carbonless oil and coalescence are shown by this example.
2) Examples identified as TAS0411071, TAS0411072, TAS0412071, TAS0412072, TAS0416071, and TAS0416072 demonstrate encapsulation of several fragrance oil materials (cedar, peppermint, lemon, fir needle, citronella, and lavender oils).
3) Examples identified as TAS0417071 and TAS0417072 use a blend of the 6 fragrance oils from #2 above, and compare capsules made by the process of the invention compared to prior art processes. Examples identified as TAS0417071 and TAS0417072 show improved permeability by liquid extraction over a long time interval as shown by FIG. 1.
4) Examples identified as TAS0423072, TAS0424071, TAS0424072 use a blend of 2% I6B red dye in ME130 and comparison of results with the current method as compared to results with the prior art processes. Comparative Example 13 with CN371 amine resin exhibited poor solubility and droplet coalescence.
5) Examples identified as TAS0501072, TAS0503072, TAS0508071, TAS0510071, TAS0515071, and TAS0516071 show the suitability of the current method to encapsulate polar compounds (ethyl myristate, methyl octanoate, ethyl heptanoate, ethyl benzoate, octyl octanoate, and 2-nonanone). Wall was deposited based upon surface features. Free oil (as shown by the data below, and measured by liquid extraction and GC analysis was as follows):

| Batch | Compound | % Free Oil |
|---|---|---|
| TAS0503072 | Methyl Octanoate | 0.16 |
| TAS0508071 | Ethyl Heptanoate | 0.12 |
| TAS0510071 | Ethyl Benzoate | 1.51 |
| TAS0515071 | Octyl Octanoate | 0.7 |
| TAS0516071 | 2-Nonanone | 1.03 |

6) Examples identified as TAS0411071, TAS0504072, TAS0507071, TAS0509071, TAS0510072, TAS0514072, and TAS0515072 show a series of capsules made using Cedarwood oil and a variety of core materials. A batch made using a prior art process (CN371 oligomer as the amine) is compared to batches made using 3 amine monomers (TBAEMA, DMAEMA, and DEAEMA), and several wall materials (SR444, CN997, SR295, and SR206). Extraction time reflected acceptable permeability.

7) Examples identified as TAS0411072, TAS0529072, TAS0530072, TAS0531071, TAS0531072, TAS0601071, TAS0601072, and TAS0604071 were prepared using peppermint oil as the core material. Batches prepared using the current method and various wall materials (SR444, SR295, SR206, SR355, and SR248) are compared to batches produced using the prior art processes and optimized levels of 2 amine acrylate oligomers (CN371, CN551). As the following free oil data indicates, for a given wall material the wall leakage can be controlled by the selection of wall material and process conditions using the materials and methods of the invention.

| Batch | % Free Oil |
|---|---|
| TAS0411072 | 0.212 |
| TAS0529072 | 0.443 |
| TAS0530072 | 0.194 |
| TAS0531071 | 0.672 |
| TAS0531072 | 2.592 |
| TAS0601071 | 2.761 |
| TAS0601072 | 0.481 |
| TAS0604071 | 2.365 |

Figure 2:
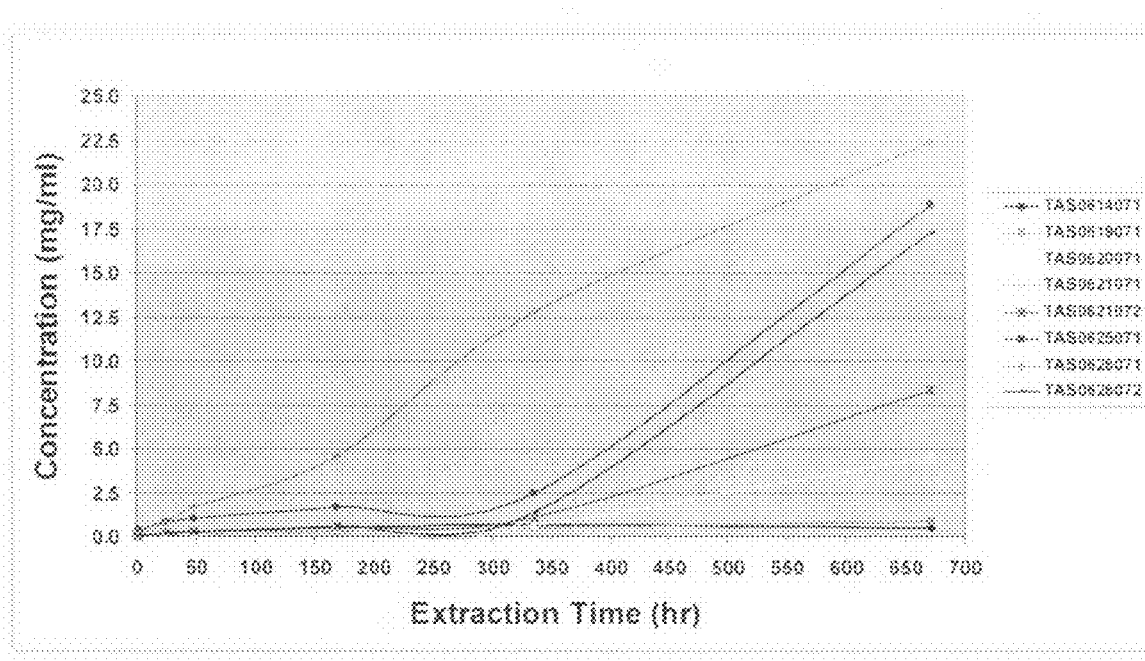

8) Examples identified as TAS0614071, TAS0619071, TAS0620071, TAS0621071, TAS0621072, TAS0625071, TAS0626071, and TAS0626072 are batches prepared using 2% I6B in Oleocal ME-130 as the core material, TBAEMA as the amine, and SR444 as the wall material. The batches compared various process variables such as amine level, acid level, water phase NaOH level, and a variety of pre-reaction temperatures and hold times. The results of permeability data FIG. 2 indicate that capsule wall permeabilities can be controlled with process conditions.

Figure 3:
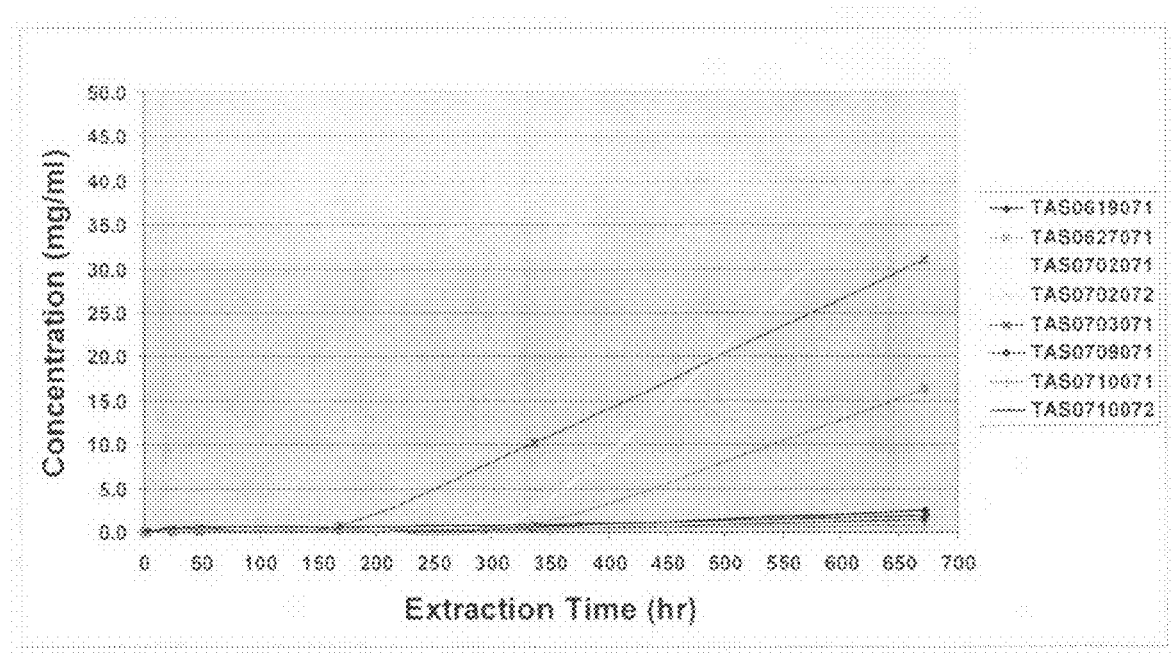

9) Examples identified as TAS0619071, TAS0627071, TAS0702071, TAS0702072, TAS0703071, TAS0709071, TAS0710071, and TAS0710072 were prepared with 2% I6B dye in ME-130 as the core material, TBAEMA as the amine monomer, and SR444 as the primary wall monomer. The permeability data in FIG. 3 show reaction conditions can be used to control permeability levels.

Figure 4:
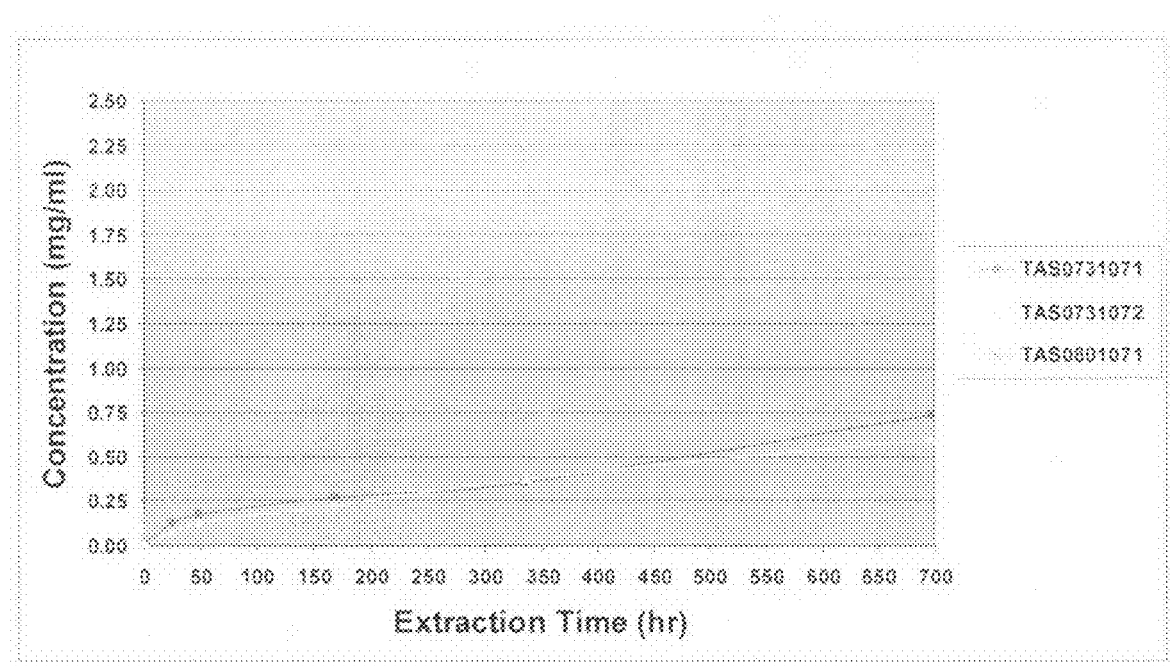

10) Examples identified as TAS0731071, TAS0731072, and TAS0801071 show capsules prepared with the 2% I6B dye in ME-130 core but with SR444, SR355, and SR206 wall. As shown by FIG. 4, all result in low permeability capsules. For comparison in Example 52 through 62, extracted core material for conventional carbonless type capsules is typically on the order of 1.84 ug/in$^2$. The microcapsules of the invention when coated onto a substrate can be fashioned to have a permeability over a ten minute test period of less than 1.4 mg/in$^2$ of substrate.

Figure 5:
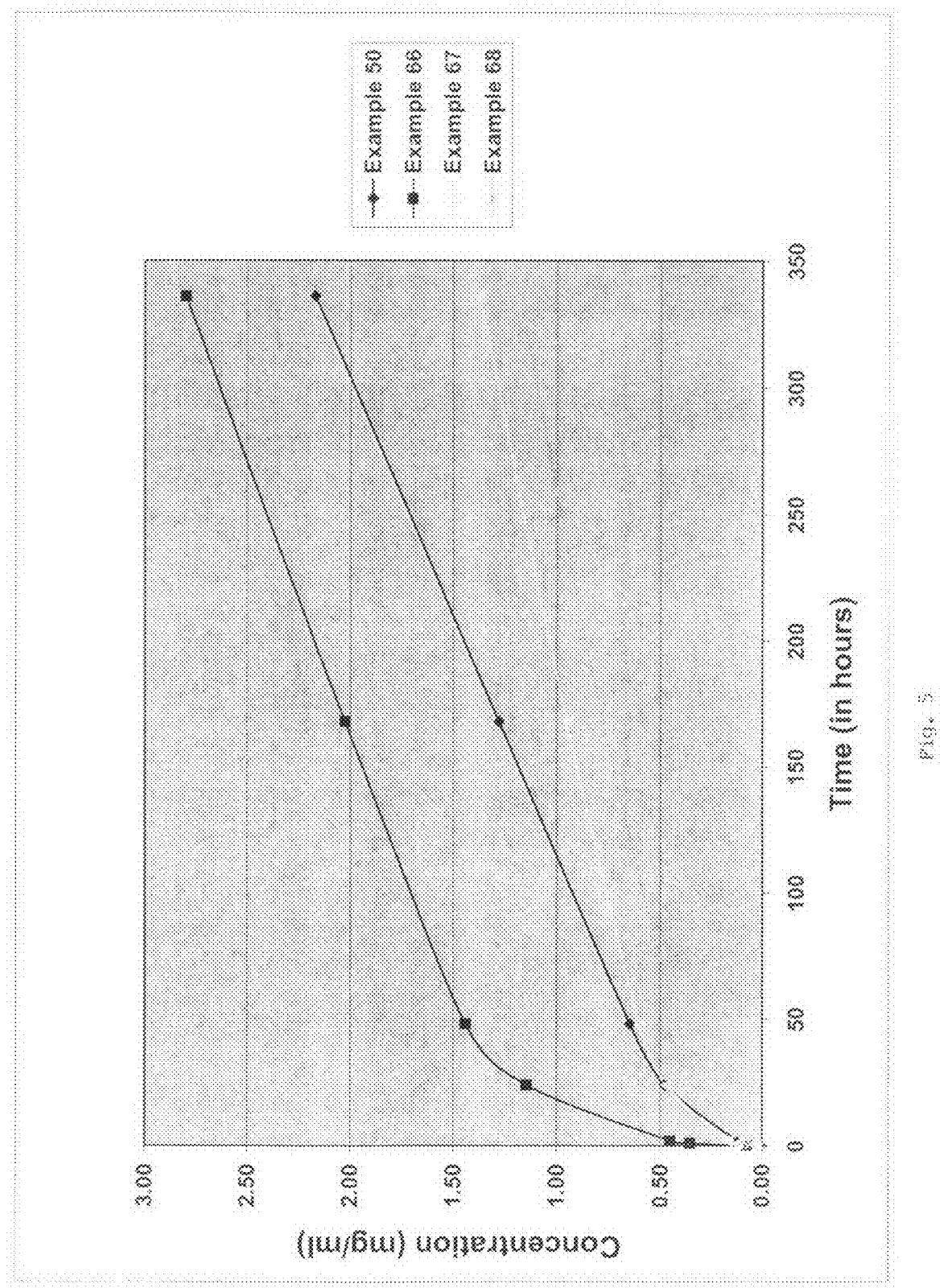

11) Examples 63-65 are general examples, providing a description of the process for making capsules with UV initiation in the wall pre-reaction, capsule curing, or both steps. Examples 66-68 provide specific examples corresponding to the general examples given in examples 63-65. FIG. 5 shows capsule leakage data for examples 66-68 along with a comparison to a repeat of batch TAS0731072 (Example 50) but made in a UV transparent glass, jacketed reactor and a smaller volume batch.

Example 63

Thermal Pre-Reaction, UV-Cured Wall

The systems described was prepared with a core consisting of 2% I6B dye in soybean oil methyl ester, SR355 was the primary wall material, TBAEMA was the oil-soluble amine, and MBM was the oil-soluble acid. The oil solution contained Vazo-52 (thermally initiator) along with a photo initiator (in this case Ciba Irgacure 651 or Ciba Darocure 1173). The water phase contained another photo initiator (Ciba Darocure 1173). Batches were prepared in a glass, jacketed reactor, and a nitrogen blanket was applied at 300 cc/min.

Oil containing the initiators was heated to 75° C., held at 75° C. for 30 minutes, cooled to 55° C. in 75 minutes. Additional wall material-containing oil solution was added, and the combined oils were held at 55° C. for another 30 minutes before addition of the water phase and the start of milling. After milling the emulsion was mixed for 45 minutes at 55° C. before the application of a UV lamp. The 200 Watt UV source was placed about 1 inch from the side of the glass reactor for curing. The UV lamp was applied for 18 hours to allow for thorough wall curing. The UV cured capsules were fairly well-formed and durable. Hexane leakage data at 5 hours measured approximately 0.13 mg/ml for a comparable thermal cured system and 0.32 mg/ml for a UV-cured system. This UV cured capsule has a different leakage profile compared with a comparable heat initiated system, but forms an acceptable slow release microcapsule intended for purposes hereof as low permeance. This type of release profile is desirable in certain applications such as time release cleaners, surface modifiers, textile treatments, additives on or to nonwovens, fragrance delivery substrates, sensors responsive to a particular environmental condition, indicators and the like.

The leakage profile can also be adjusted or altered by modifying curing conditions or modifying wall formulation materials or concentrations.

Example 64

UV Pre-Reaction, UV-Cured Wall

The oil phase contained core material (2% I6B in ME-130 in this case), SR355, TBAEMA, MBM, and Irgacure 651 photo initiator. The level of photo initiator used was 20-80% of the level of thermal initiator typically employed. Half of the total oil-phase photo initiator was initially placed in the oil phase. The batch was prepared in a jacketed, glass reactor with application of a nitrogen blanket at 300 cc/min. The oil was treated with a UV lamp for 5 minutes. After treatment the oil phase had generally become cloudy. The second-half of the oil phase photo initiator was added and allowed to dissolve. The water phase (with water phase initiator Darocure 1173) was added and milling begun. After milling the batch wall allowed to mix for 45 minutes before application of the UV lamp for 18 hours.

The mean particle size of the UV cured capsules was 13.93 μm.

Example 65

UV Pre-Reaction, Thermally Cured Wall

The oil phase contained core material (2% I6B in ME-130 in this case), SR355, TBAEMA, MBM, thermal initiator, and Irgacure 651 photo initiator. The level of photo initiator used was 20-80% of the level of thermal initiator typically employed. The oil was held at 35° C. with a nitrogen blanket applied at 300 cc/min. and mixing at 750 rpm with a 6-tip star mill. The oil was treated with a UV lamp for 5 minutes. After treatment, the oil phase had become cloudy. The water phase (with water phase initiator Vazo 68WSP) was added without mixing, and milling begun. After milling the batch was mixed with a flat paddle mixer at 400 rpm. The batch was held at 35° C. for 45 minutes, heated to 75° C. in 45 minutes, held at 75° C. for 4 hours, heated to 90° C. in 45 minutes, and held at 90° C. for 8 hours.

Example 66

An oil solution, containing 10 g of 2% I6B in Oleocal ME-130, 1 g Vazo-52 and 1 g Irgacure 651, was placed in a 35° C. glass jacketed reactor with mixing at 750 rpm (6-tip star mill) and with a nitrogen blanket at 300 cc/min. The oil solution was heated from 35° C. to 75° C. in 45 minutes and held at 75° C. for 30 minutes. The oil solution was then cooled from 75° C. to 55° C. in 75 minutes. A second oil solution (pre-heated to 55° C.), containing 25 g 2% I6B in ME-130, 12.25 g SR355, 0.25 g TBAEMA, and 0.5 g MBM, was added to the reactor and the combined oils held at 55° C. for 30 minutes. Mixing was stopped and a water phase, containing 300 g water, 12.5 g Colloid 351, 1.0 g 20% NaOH, and 1 g Darocure 1173, was added to the bottom of the oil phase. Milling was started, at 2750 rpm and continued for 60 minutes (final emulsion size: 11.2μ). After milling was completed, mixing was done with a flat paddle mixer at 400 rpm. The batch was held at 55° C. for 45 minutes and then the UV lamp (200 W output) was applied to the glass reactor at a distance of less than 2 inches. The UV lamp was applied for 18 hours.

Example 67

An oil solution, containing 125 g of 2% I6B in ME-130, 12.25 g SR355, 0.25 g TBAEMA, 0.5 g MBM, and 0.1 g Irgacure 651, was placed in a 35° C. glass, jacketed reactor with mixing at 750 rpm (6-tip star mill) and with a nitrogen blanket at 300 cc/min. The UV lamp (200 W output) was applied for 10 minutes at a distance of less than 2" from the side of the reactor. After the lamp was turned off, another 0.1 g of Irgacure 651 was added, and the oil was mixed for about 5 minutes to dissolve the material completely. Mixing was stopped and a water phase, containing 300 g water, 12.5 g Colloid 351, 1.0 g 20% NaOH, and 1 g Darocure 1173, was added near the bottom of the oil via funnel. The batch was milled at 2750 rpm for 60 minutes resulting in a 9.27μ emulsion at the end of milling. After milling was completed, mixing was done with a flat paddle mixer at 400 rpm. After a hold period of 45 minutes (at 35° C.), the UV lamp was again applied for 18 hours to cure the capsule wall.

Example 68

An oil solution, containing 125 g 2% I6B in ME-130, 12.25 g SR355, 0.25 g TBAEMA, 0.5 g MBM, 0.25 g Irgacure 651, 0.5 g Vazo-52, and 0.5 g Vazo-67, was placed in a jacketed, glass reactor at 35° C. with a nitrogen blanket on at 300 cc/min, and mixed with a 6-tip star mill blade at 750 rpm. The UV lamp (200 W output) was applied for 5 minutes at a distance of less than 2" from the reactor. After the UV lamp was turned off, mixing was stopped and a water phase, containing 300 g water, 12.5 g Colloid 351, 2.5 g 20% NaOH, and 1 g Vazo-68WSP (water-soluble Vazo), was added to the bottom of the oil phase using a funnel. Milling began, and continued at 2750 rpm for 60 minutes, resulting in an emulsion at the end of milling with a median particle size of 12.53μ. After milling was completed, mixing was done at 400 rpm with a flat paddle mixer. The batch was held at 35° C. for 45 minutes, heated to 75° C. in 45 minutes, held at 75° C. for 4 hours, heated to 90° C. in 45 minutes and held at 90° C. for 8 hours.

What is claimed is:

1. A population of low permeability microcapsule particles comprising an oil soluble or dispersible core material and a wall material at least partially surrounding the core material, the microcapsule wall material consisting of:
the reaction product of a first composition in the presence of a second composition consisting of an anionic emulsifier, the first composition consisting of a reaction product of i) an oil soluble or dispersible amine selected from the group consisting of aminoalkylacrylate and aminoalkyl methacrylate with ii) a multifunctional acrylate or methacrylate monomer or oligomer, an oil soluble acid and an initiator, wherein the ratio of amine to the multifunctional acrylate or methacrylate is from 0.1:99.9 to 10:90,
the anionic emulsifier consisting of a water soluble or water dispersible acrylic acid alkyl acid copolymer, an alkali or alkali salt, and optionally a water phase initiator, wherein the first composition initiator and/or the water phase initiator is an energy-activated initiator,
whereby the reaction product of the first composition and second composition results in the formation of a population of microcapsules having a microcapsule wall of low permeance to the core material.

2. The population of microcapsules according to claim 1 wherein the energy-activated initiator is a UV initiator.

3. The population of microcapsule particles according to claim 1 wherein the amine is a secondary or tertiary amine.

4. The population of microcapsule particles according to claim 1 wherein the amine is an amine oligomer.

5. The population of microcapsule particles according to claim 1 wherein the amine is selected from the group consisting of diethylaminoethyl methacrylate, dimethylaminoethyl methacrylate, and tertiarybutyl aminoethyl methacrylate.

6. The population of microcapsule particles according to claim 1 wherein the microcapsule has a percent of free oil of less than 4%.

7. The population of microcapsule particles according to claim 1 wherein the core material comprises a material selected from the group consisting of chromogens, dye, perfume, flavorant, sweetener, oil, pigment, pharmaceutic, moldicide, herbicide, fertilizer, phase change material, and adhesive.

8. The population of microcapsule particles according to claim 1 including in addition a binder and a substrate material onto which the microcapsule is adhered.

9. The population of microcapsule particles according to claim 1 wherein the energy-activated initiator is a UV initiator and a ketone compound.

10. The population of microcapsule particles according to claim 1 wherein the initiator is a UV initiator selected from the group consisting of benzophenone; acetophenone; benzyl; benzaldehyde; o-chlorobenzaldehyde; xanthone; thioxanthone; 9,10-anthraquinone; 1-hydroxycyclohexyl phenyl ketone; 2,2-diethoxyacetophenone; dimethoxyphenylacetophenone; methyl diethanolamine; dimethylaminobenzoate; 2-hydroxy-2-methyl-1-phenylpropane-1-one; 2,2-di-sec-butoxyacetophenone; 2,2-dimethoxy-1,2-diphenylethan-1-one; dimethoxyketal; phenyl glyoxal 2,2'-diethoxyacetophenone; hydroxycyclohexyl phenyl ketone; alpha-hydroxyketone; alpha-amino-ketone; alpha naphthyl carbonyl compounds; beta naphthyl carbonyl compounds; benzoin ether; benzoin methyl ether; benzyl; benzyl ketals;

benzyl dimethyl ketal, acetophenone, fluorenone, and 2-hydroxy-2-methyl-1-phenylpropan-1-one.

11. The population of microcapsule particles according to claim 1 wherein the first composition initiator comprises a UV initiator.

12. A process for forming a microcapsule of selected permeability, the process comprising preparing a core material of an oil and an initiator;
   preparing a first composition consisting of a reaction of i) an oil soluble or dispersible amine selected from the group consisting of aminoalkyl acrylate and aminoalkyl methacrylate with ii) a multifunctional acrylate or methacrylate monomer or oligomer, an oil soluble acid and an energy-activated initiator, and reacting the first composition at a first temperature;
   wherein the ratio of amine to the multifunctional acrylate or methacrylate is from 0.1:99.9 to 10:90,
   adding the core material to the first composition,
   preparing a second composition consisting of an anionic emulsifier comprising a water soluble or water dispersible acrylic acid alkyl acid copolymer, water and an alkali or alkali salt, adding the second composition to the first composition and stirring to form droplets of the core material dispersed in the first composition; and, applying an energy source appropriate to the initiator to initiate curing of the wall around the droplets thereby forming microcapsules.

13. The process according to claim 12 wherein the energy-activated initiator is a UV initiator.

14. The process according to claim 12 wherein preparing the first composition comprises the reaction product of an oil soluble or dispersible secondary or tertiary amine.

15. The process according to claim 12 wherein preparing the first composition comprises preparing the reaction product of an aminoalkyl acrylate, aminoalkyl methacrylate, diethylaminoethyl methacrylate, dimethylaminoethyl methacrylate, or tertiary butyl aminoethyl methacrylate, and an oil soluble acid and an initiator.

16. The microcapsule according to claim 12 wherein preparing the core material comprises blending a material selected from the group consisting of chromogen, dye, perfume, flavorant, sweetener, oil, pigment, pharmaceutic, moldicide, herbicide, fertilizer, phase change material, or adhesive with an oil.

17. The process according to claim 12 wherein the first composition is first dispersed in an oil solvent.

18. The process according to claim 12 wherein the anionic emulsifier optionally includes an energy-activated initiator.

19. The process according to claim 18 wherein the energy-activated initiator is a UV initiator.

20. The process according to claim 12 wherein the microcapsules when coated onto a substrate have a permeability over a 10 minute test period of less than 1.4 mg/in$^2$ of substrate.

21. The process of forming a microcapsule according to claim 12 wherein the initiator is an energy-activated initiator, such as a UV initiator and a ketone compound.

22. The process of forming a microcapsule according to claim 12 wherein the initiator is a UV initiator selected from the group consisting of benzophenone; acetophenone; benzyl; benzaldehyde; o-chlorobenzaldehyde; xanthone; thioxanthone; 9,10-anthraquinone; 1-hydroxycyclohexyl phenyl ketone; 2,2-diethoxyacetophenone; dimethoxyphenylacetophenone; methyl diethanolamine; dimethylaminobenzoate; 2-hydroxy-2-methyl-1-phenylpropane-1-one; 2,2-di-sec-butoxyacetophenone; 2,2-dimethoxy-1,2-diphenylethan-1-one; dimethoxyketal; phenyl glyoxal 2,2'-diethoxyacetophenone; hydroxycyclohexyl phenyl ketone; alpha-hydroxyketone; alpha-amino-ketone; alpha naphthyl carbonyl compounds; beta naphthyl carbonyl compounds; benzoin ether; benzoin methyl ether; benzyl; benzyl ketals; benzyl dimethyl ketal; acetophenone; fluorenone; and 2-hydroxy-2-methyl-1-phenylpropan-1-one.

23. The process of forming microcapsules according to claim 12 wherein the first composition reaction product is created by energy-initiation, and includes an energy-activated initiator, such a UV initiator.

* * * * *